US009839084B2

(12) United States Patent
Palfreyman et al.

(10) Patent No.: US 9,839,084 B2
(45) **Date of Patent: *Dec. 5, 2017**

(54) LIGHTING SYSTEMS WITH REMOVABLE ILLUMINATION MODULES

(71) Applicants: Paul Palfreyman, Vancouver (CA); Paul Jungwirth, Burnaby (CA); Jane Wei Yang, Port Coquitlam (CA); Michael A. Tischler, Vancouver (CA)

(72) Inventors: Paul Palfreyman, Vancouver (CA); Paul Jungwirth, Burnaby (CA); Jane Wei Yang, Port Coquitlam (CA); Michael A. Tischler, Vancouver (CA)

(73) Assignee: COOLEDGE LIGHTING INC., Richmond, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,704

(22) Filed: Jun. 15, 2016

(65) Prior Publication Data

US 2016/0363276 A1 Dec. 15, 2016

Related U.S. Application Data

(60) Provisional application No. 62/175,725, filed on Jun. 15, 2015, provisional application No. 62/242,630, filed on Oct. 16, 2015.

(51) Int. Cl.

| | |
|---|---|
| ***H05B 37/00*** | (2006.01) |
| ***H05B 33/08*** | (2006.01) |
| ***F21S 2/00*** | (2016.01) |
| ***F21V 3/00*** | (2015.01) |
| ***F21V 7/00*** | (2006.01) |

(Continued)

(52) U.S. Cl.

CPC ............ *H05B 33/083* (2013.01); *F21S 2/005* (2013.01); *F21V 3/00* (2013.01); *F21V 7/00* (2013.01); *F21V 23/005* (2013.01); *F21V 23/02* (2013.01); *F21V 23/06* (2013.01); *H05B 33/0812* (2013.01); *H05B 33/0827* (2013.01); *F21Y 2115/10* (2016.08); *H05B 33/0845* (2013.01); *H05B 33/0857* (2013.01)

(58) Field of Classification Search

CPC ............ H05B 33/0809; H05B 33/0812; H05B 33/0815; H05B 33/0827; H05B 33/0845; H05B 33/083

USPC ..................................... 315/185 R, 192, 193

See application file for complete search history.

(56) References Cited

U.S. PATENT DOCUMENTS 8,766,543 B1 7/2014 Janning
9,414,453 B2 * 8/2016 Yoo .................... H05B 33/0827

(Continued)

FOREIGN PATENT DOCUMENTS

WO 2013/036561 A2 3/2013

OTHER PUBLICATIONS

International Search Report and Written Opinion issued in a corresponding International Application No. PCT/US2016/037487 dated Oct. 17, 2016.

*Primary Examiner* — Tung X Le
(74) *Attorney, Agent, or Firm* — Morgan, Lewis & Bockius LLP

(57) ABSTRACT

In accordance with certain embodiments, lighting systems feature lightsheets including multiple illumination units or modules electrically interconnected such that unremoved illumination units or modules remain energized upon removal of at least a portion of one or more illumination units or modules.

28 Claims, 35 Drawing Sheets

(51) Int. Cl.

| | |
|---|---|
| ***F21V 23/00*** | (2015.01) |
| ***F21V 23/02*** | (2006.01) |
| ***F21V 23/06*** | (2006.01) |
| *F21Y 115/10* | (2016.01) |

(56) References Cited

U.S. PATENT DOCUMENTS

2004/0212310 A1* 10/2004 Ito .......................... B60Q 11/00
315/77
2011/0133224 A1* 6/2011 Zoorob ............... H01L 25/0753
257/88
2011/0169417 A1 7/2011 Hum et al.
2013/0234609 A1* 9/2013 Akiyama ............. H05B 33/083
315/185 R
2014/0062315 A1 3/2014 Tischler et al.
2015/0061534 A1 3/2015 Grajcar
2015/0382420 A1* 12/2015 Sakai ................. H05B 33/0803
315/193

* cited by examiner 610
220
145
610
620
120
121

LIGHTING SYSTEMS WITH REMOVABLE ILLUMINATION MODULES

RELATED APPLICATIONS

This application claims the benefit of and priority to U.S. Provisional Patent Application No. 62/175,725, filed Jun. 15, 2015, and U.S. Provisional Patent Application No. 62/242,630, filed Oct. 16, 2015, the entire disclosure of each of which is hereby incorporated herein by reference.

FIELD OF THE INVENTION

In various embodiments, the present invention generally relates to electronic devices, and more specifically to array-based lighting devices.

BACKGROUND

Broad-area illumination systems are used in a wide range of applications, e.g., backlighting of signs and graphic panels, as well as backlighting of decorative, non-information-carrying panels, such as translucent stone, luminous ceilings, luminous walls, and the like. Such applications may involve illumination of hundreds or thousands of square feet and thus require a large number of individual light sources. Typically, lighting solutions for these applications have a number of competing requirements, including uniform illumination (both intensity and color), thin system profile, the ability to customize both the size and shape of the illuminated structure, high efficiency, and low cost. Systems designed for outdoor, wet, or other challenging environments have additional requirements related to protection of the lighting system.

These needs are often at odds with each other. For example, variations in light and/or color intensity may be mitigated by having a deep (i.e., thick) mixing chamber to homogenize the light among the illumination sources within the system, but this makes the overall system significantly thicker. Thin systems typically require a larger number of light sources in order to reduce the mixing chamber depth, which increases the cost.

Uniform illumination across custom shapes and sizes is particularly difficult to achieve for a number of reasons. Incandescent and fluorescent light sources come in fixed sizes, limiting the granularity of the illumination sources—for example, fluorescent tubes come in fixed lengths and cannot be cut to length. Lighting systems based on light-emitting diodes (LEDs) typically are mounted on a circuit board having an electrical topology not amenable to being cut to length. For example, for large-area lighting applications, LEDs may be electrically laid out in groups of series-connected strings, e.g., on a square or rectangular tile, where each string contains multiple series-connected LEDs all operating at the same current. While in some topologies, one or more strings may be removed to permit dimensional customization, parts of a string typically cannot be removed without opening the circuit and causing de-energization of that string. The physical layout of the string therefore may limit the level of achievable granularity. Once installed in a lighting system, such fixed size illumination sources may visually result in regions having undesirably different light intensity levels or colors. A second issue with removing LED strings is that such systems are typically driven by a constant-current driver, so when one or more strings are removed, the current from the driver is divided among fewer strings, resulting in a local brightness increase. The lack of granularity in the sizing of the illumination sources and/or possible current variations between LEDs or groups of LEDs may result in visually distinguishable variations in light intensity level and/or color, for example correlated color temperature (CCT). From an application perspective, this is undesirable because the illumination level is desirably uniform over the entire illuminated area.

Another electrical topology that may be utilized for LED-based illumination sources is the connection of all of the LEDs in parallel. This topology may permit removal of individual LEDs and thus may achieve relatively finer granularity, in some cases on the order of the LED spacing. However, such systems are prone to "current hogging," in which the current preferentially flows through the LED(s) with the lowest forward voltage. This can result in increased heating of such LEDs, which further reduces the forward voltage, thus increasing the current—this process can continue until those LEDs fail. In some cases, this process may occur over and over, for example cascading from one LED to the LED having the next lowest forward voltage in the system. In some cases, this effect may be mitigated by carefully matching the forward voltage of all of the LEDs, but this typically adds significant expense. Another approach is to incorporate a ballast resistor or other current-limiting device with each LED; however, this may increase cost and significantly reduce efficiency because of the power loss in the ballast resistor. A further efficiency disadvantage of this electrical topology is that it typically is driven at about the forward voltage of one LED. Low-voltage systems typically have increased power losses in the lines (wires) as well as lower driver efficiency.

A third electrical topology, using a constant-voltage supply in combination with an array, for example a parallel array, of small, low-cost LEDs configured in strings of series-connected LEDs, where each string also includes a current-regulating element, addresses a number of the deficiencies of the systems described above. Exemplary electrical and physical schematics of this approach are shown in FIGS. 1A and 1B respectively. This approach is described in detail in U.S. patent application Ser. No. 13/799,807, filed on Mar. 13, 2013, (the '807 application) and U.S. patent application Ser. No. 13/970,027, filed on Aug. 19, 2013 (the '027 application), the entirety of each of which is incorporated herein by reference. Such as lighting system may include power conductors 120 and 121, which supply power to strings 150. Each string 150 includes light-emitting elements (LEEs) 140 electrically connected in series by conductive elements 160 and energized by power from power conductors 120 and 121. Each string 150 also includes a current control element 145, which regulates the current in each string. In various embodiments strings 150 may be electrically connected in parallel with each other. One or more strings may be removed from the system without changing the brightness of the LEEs in the other strings. Strings may be straight, as shown in FIG. 1A, or folded, as shown in FIG. 1B (a folded string has multiple segments (in FIG. 1B they are parallel) between power conductors 120 and 121. (Here folded refers to the physical layout of the strings, rather than any particular geometric configuration of the system itself). In this example, power conductors 120, 121, conductive elements 160, control elements 145 and LEEs 140 are mounted on substrate or circuit board 165. The system granularity is determined at the base level by the LEE pitch 125. For a straight string, the size increment is on the order of pitch 125. For a folded string, the size increment is on the order of an integer multiple of pitch 125. The relatively small pitch permits a relatively thin system, for example including the light source and an overlying diffuser or optic, for example on the order of about 1.5 or 2 times the pitch distance.

The system described in relation to FIGS. 1A and 1B permits customization in one direction. For example, this may be used to produce a linear illuminated region having the sheet width, with the length customized by cutting off one or more strings. However, many applications require area lighting, such as shown in FIG. 1C, in which the desired illuminated area is not an integer multiple of the sheet width and/or length. In this case, fixed-size pieces or sheets of lighting system 110 may be tiled together to cover a desired portion 172 of a total area 170. A cut-to-length system may be used to tile regions 174 and 176, the dimensions of which are smaller in one direction than the tiles used in region 172. However, region 178, which requires cutting in two directions (in this case in substantially orthogonal directions), typically cannot be illuminated via this approach. That is, both dimensions of region 178 are smaller than those of available light-system sheets 110, which will not function properly if cut along both dimensions to the desired size. Similar challenges arise for non-rectangular shapes, such as those shown in FIGS. 1D and 1E. In these cases, square or rectangular tiles may be used to fill up most of the area, but undesirably non-illuminated regions remain. Furthermore, area lighting systems may be required to accommodate various penetrations or holes in the lighting plane, or regions without one or more illumination sources, for example for fire suppression systems such as sprinkler heads or the like, smoke or fire sensors, cameras, heating, ventilation and air conditioning ducts, supports or stand-offs for overlying material such as diffusers, optics, fabric or the like.

In view of the foregoing, a need exists for systems and procedures for thin, low-cost lighting systems enabling uniform illumination of arbitrarily sized areas.

SUMMARY

Embodiments of the present invention relate to illumination systems based on areal light sheets that incorporate functionality that enables the arbitrary removal of one or more light-emitting elements, and/or one or more strings of light-emitting elements, while maintaining functionality of the unremoved light-emitting elements and light-emitting strings. In various embodiments, after removal of a light-emitting element or string, the same operating voltage is maintained across the remaining, unremoved light-emitting elements or strings despite the removal of one or more light-emitting elements. Embodiments of the invention thus enable the shaping and/or size reduction of standard light sheets to meet a variety of different requirements.

As utilized herein, the term "light-emitting element" (LEE) refers to any device that emits electromagnetic radiation within a wavelength regime of interest, for example, visible, infrared or ultraviolet regime, when activated, by applying a potential difference across the device or passing a current through the device. Examples of light-emitting elements include solid-state, organic, polymer, phosphor-coated or high-flux LEDs, laser diodes or other similar devices as would be readily understood. The emitted radiation of an LEE may be visible, such as red, blue or green, or invisible, such as infrared or ultraviolet. An LEE may produce radiation of a continuous or discontinuous spread of wavelengths. An LEE may feature a phosphorescent or fluorescent material, also known as a light-conversion material, for converting a portion of its emissions from one set of wavelengths to another. In some embodiments, the light from an LEE includes or consists essentially of a combination of light directly emitted by the LEE and light emitted by an adjacent or surrounding light-conversion material. An LEE may include multiple LEEs, each emitting essentially the same or different wavelengths. In some embodiments, a LEE is an LED that may feature a reflector over all or a portion of its surface upon which electrical contacts are positioned. The reflector may also be formed over all or a portion of the contacts themselves. In some embodiments, the contacts are themselves reflective. Herein the term "reflective" is defined as having a reflectivity greater than 65% for a wavelength of light emitted by the LEE on which the contacts are disposed unless otherwise defined. In some embodiments, an LEE may include or consist essentially of an electronic device or circuit or a passive device or circuit. In some embodiments, an LEE includes or consists essentially of multiple devices, for example an LED and a Zener diode for static-electricity protection. In some embodiments, an LEE may include or consist essentially of a packaged LED, i.e., a bare LED die encased or partially encased in a package. In some embodiments, the packaged LED may also include a light-conversion material. In some embodiments, the light from the LEE may include or consist essentially of light emitted only by the light-conversion material, while in other embodiments the light from the LEE may include or consist essentially of a combination of light emitted from an LED and from the light-conversion material. In some embodiments, the light from the LEE may include or consist essentially of light emitted only by an LED.

In one embodiment, an LEE includes or consists essentially of a bare semiconductor die, while in other embodiments an LEE includes or consists essentially of a packaged LED. In some embodiments, LEE may include or consist essentially of a "white die" that includes an LED that is integrated with a light-conversion material (e.g., a phosphor) before being attached to the light sheet, as described in U.S. patent application Ser. No. 13/748,864, filed Jan. 24, 2013, or U.S. patent application Ser. No. 13/949,543, filed Jul. 24, 2013, the entire disclosure of each of which is incorporated by reference herein.

In an aspect, embodiments of the invention feature a lighting system that includes, consists essentially of, or consists of a lightsheet. The lightsheet includes, consists essentially of, or consists of a substrate, a first power conductor disposed on the substrate, a second power conductor disposed on the substrate and electrically isolated from the first power conductor, and a plurality of light-emitting strings each electrically connected between and being energizable via the first and second power conductors. Each light-emitting string includes, consists essentially of, or consists of a plurality of electrically connected illumination units. Each illumination unit includes, consists essentially of, or consists of (i) one or more electrically connected light-emitting elements, and (ii) a bypass element (a) electrically connected across the first and second power conductors and (b) configured to transition from a high-impedance state to a low-impedance state and thereby complete a circuit between the first and second power conductors upon removal of the one or more light-emitting elements of the illumination unit from the lightsheet, whereby energization of unremoved light-emitting elements within the light-emitting string is maintained.

Embodiments of the invention may include one or more of the following in any of a variety of combinations. At least one of the bypass elements (or even each of the bypass elements) may include, consist essentially of, or consist of a switch, a relay, a Zener diode, and/or a circuit including, consisting essentially of, or consisting of at least one transistor and at least one resistor. The illumination units within at least one light-emitting string (or even each light-emitting string) may be electrically connected in series. The illumination units within at least one light-emitting string (or even each light-emitting string) may be electrically connected in parallel. At least one light-emitting string may include a second illumination unit that includes, consists essentially of, or consists of one or more electrically connected light-emitting elements without a bypass element associated therewith. The lighting system may include a power supply electrically connected to the first and second power conductors. The at least one light-emitting string may extend from a proximal end proximate the power supply to a distal end away from the power supply. The second illumination unit may be disposed at the proximal end. For at least one light-emitting string, at least one illumination unit may include (i) a voltage-drop element and (ii) a shunt configured to (a) prevent voltage drop across the voltage-drop element when the one or more light-emitting elements of the illumination unit are present on the lightsheet, and (b) upon removal of the one or more light-emitting elements of the illumination unit, cause a voltage drop across the voltage-drop element. The shunt may be configured to be at least partially removed upon removal of the one or more light-emitting elements of the illumination unit, thereby causing the voltage drop across the voltage-drop element. The voltage drop across the voltage-drop element may be approximately equal to a voltage drop across the one or more light-emitting elements of the illumination unit when the one or more light-emitting elements of the illumination unit are present on the lightsheet. The voltage-drop element may include, consist essentially of, or consist of one or more resistors.

The lighting system may include one or more control elements configured to control current to at least one of the light-emitting strings. The one or more control elements may include, consist essentially of, or consist of a plurality of control elements. Each light-emitting string may have a different control element electrically coupled thereto. At least one light-emitting element of at least one illumination unit may include, consist essentially of, or consist of a light-emitting diode. The light-emitting diode may emit substantially white light. The substrate may be flexible. A string pitch at which the light-emitting strings are spaced across the substrate may be substantially constant across the substrate. Along each light-emitting string, a pitch at which the light-emitting elements are spaced may be substantially constant.

The lighting system may include a third power conductor disposed on the substrate, a fourth power conductor disposed on the substrate and electrically isolated from the third power conductor, and a plurality of second light-emitting strings each electrically connected between and being energizable via the third and fourth power conductors. Each second light-emitting string may include, consist essentially of, or consist of a plurality of electrically connected third illumination units. Each third illumination unit may include, consist essentially of, or consist of (i) one or more electrically connected second light-emitting elements having an optical characteristic different from a corresponding optical characteristic of the light-emitting elements, and (ii) a second bypass element (a) electrically connected across the third and fourth power conductors and (b) configured to transition from a high-impedance state to a low-impedance state and thereby complete a circuit between the third and fourth power conductors upon removal of the one or more second light-emitting elements of the third illumination unit from the lightsheet, whereby energization of unremoved second light-emitting elements within the second light-emitting string is maintained. At least one second light-emitting string may include a fourth illumination unit including, consisting essentially of, or consisting of one or more electrically connected light-emitting elements without a second bypass element associated therewith. The lighting system may include a second power supply electrically connected to the third and fourth power conductors. The power supply and the second power supply may be the same power supply, or they may be different and discrete from each other. The at least one second light-emitting string may extend from a proximal end proximate the second power supply to a distal end away from the second power supply. The fourth illumination unit may be disposed at the proximal end. The third power conductor may be electrically isolated from the first and second power conductors. The fourth power conductor may be electrically isolated from the first and second power conductors. The optical characteristic may include, consist essentially of, or consist of correlated color temperature, color rendering index, R9, spectral power distribution, and/or spatial light intensity distribution.

The lightsheet may include one or more connectors for mechanical and/or electrical connection to an adjoining lightsheet. At least one of the connectors may include, consist essentially of, or consist of a snap connector. A second lightsheet may be mechanically and/or electrically connected to the lightsheet. The lighting system may include a first snap connector electrically connected to the first power conductor, a second snap connector electrically connected to the second power conductor, and a second lightsheet. The second lightsheet may include, consist essentially of, or consist of a second substrate (which may be flexible or rigid), third and fourth power conductors disposed on the second substrate, a plurality of second light-emitting elements disposed on the second substrate and electrically connected to the third and fourth power conductors, a third snap connector electrically connected to the third power conductor, and a fourth snap connector electrically connected to the fourth power conductor. The first snap connector may be configured for connection to the third snap connector, thereby electrically coupling the first power conductor to the third power conductor. The second snap connector may be configured for connection to the fourth snap connector, thereby electrically coupling the second power conductor to the fourth power conductor. The lightsheet may define therethrough a hole proximate a bypass element. The hole may be defined by removal of one or more light-emitting elements of an illumination unit.

At least one bypass element (or even each bypass element) may have a resistance of at least $10^6$ ohms in the high-impedance state. At least one bypass element (or even each bypass element) may have a resistance no greater than $10^3$ ohms in the low-impedance state. The lightsheet may have a thickness in the range of 0.25 mm to 25 mm. The lighting system may include an optic disposed over at least a portion of the lightsheet. The optic may include, consist essentially of, or consist of a lens, a diffuser, a refractive optic, a reflective optic, a Fresnel optic, a fabric, a translucent material panel, a graphic panel, and/or a membrane. A collective thickness of the lightsheet and the optic may be in the range of 0.5 cm to 20 cm. Within at least one illumination unit (or even each illumination unit), the light-emitting elements may be spaced apart at a substantially constant pitch. The substrate may define a tab extending therefrom. A portion of the first and/or second power conductors may be disposed on the tab. The substrate may define first and second tabs extending therefrom. A portion of the first power conductors may be disposed on the first tab. A portion of the second power conductor may be disposed on the second tab.

In another aspect, embodiments of the invention feature a lighting system that includes, consists essentially of, or consists of a lightsheet. The lightsheet includes, consists essentially of, or consists of a substrate, one or more first electrical contacts disposed on the substrate and electrically connected to each other, one or more second electrical contacts disposed on the substrate and electrically connected to each other, and a plurality of illumination modules disposed on the substrate and electrically connected to each other. The one or more first electrical contacts are electrically isolated from the one or more second electrical contacts. Each illumination module includes, consists essentially of, or consists of (i) one or more electrically connected light-emitting elements, (ii) a first power conductor, and (iii) a second power conductor electrically isolated from the first power conductor. The one or more light-emitting elements are electrically connected between and energizable by the first and second power conductors. The first power conductors of the illumination modules are electrically connected to the one or more first electrical contacts. The second power conductors of the illumination modules are electrically connected to the one or more second electrical contacts. The illumination modules are collectively energizable via application of power to a first electrical contact and a second electrical contact. The first and second power conductors of the illumination modules are electrically connected to enable energization of all remaining illumination modules upon removal of any illumination module from the lightsheet.

Embodiments of the invention may include one or more of the following in any of a variety of combinations. The first and second power conductors of each illumination module may form an independent path electrically connected to at least one first electrical contact and at least one second electrical contact. Removal of any illumination module may not sever the independent path formed by the first and second power conductors of any other illumination module. The lighting system may include one or more control elements configured to control current to at least one of the illumination modules. The one or more control elements may include, consist essentially of, or consist of a plurality of control elements. Each illumination module may have a different control element electrically coupled thereto. At least one illumination module may include one or more connectors for mechanical and/or electrical connection to an adjoining illumination module. At least one of the connectors may include, consist essentially of, or consist of a snap connector or a portion thereof. The light-emitting elements of at least one illumination module (or even each illumination module) may include, consist essentially of, or consist of light-emitting diodes. The light-emitting diodes may emit substantially white light. The one or more light-emitting elements of at least one illumination module may include, consist essentially of, or consist of a plurality of light-emitting elements that are electrically connected in series. The one or more light-emitting elements of at least one illumination module may include, consist essentially of, or consist of a plurality of light-emitting elements that are electrically connected in parallel.

Each illumination module may include, consist essentially of, or consist of a plurality of electrically connected illumination units. Each illumination unit may include, consist essentially of, or consist of (i) one or more electrically connected light-emitting elements, and (ii) a bypass element (a) electrically connected across the first and second power conductors and (b) configured to transition from a high-impedance state to a low-impedance state and thereby complete a circuit between the first and second power conductors upon removal of the one or more light-emitting elements of the illumination unit from the lightsheet, whereby energization of unremoved light-emitting elements within the illumination module is maintained. At least one bypass element (or even each bypass element) may have a resistance of at least $10^6$ ohms in the high-impedance state. At least one bypass element (or even each bypass element) may have a resistance no greater than $10^3$ ohms in the low-impedance state. At least one bypass element (or even each bypass element) may include, consist essentially of, or consist of a switch, a relay, a Zener diode, and/or a circuit including, consisting essentially of, or consisting of at least one transistor and at least one resistor. The illumination units within at least one illumination module (or even within each illumination module) may be electrically connected in series. The illumination units within at least one illumination module (or even within each illumination module) may be electrically connected in parallel. At least one illumination module may include a second illumination unit that includes, consists essentially of, or consists of one or more electrically connected light-emitting elements without a bypass element associated therewith. The lighting system may include a power supply electrically connected to at least one of the first electrical contacts and at least one of the second electrical contacts. The at least one illumination module may extend from a proximal end proximate the power supply to a distal end away from the power supply. The second illumination unit may be disposed at the proximal end. For at least one illumination module (or even for each illumination module), at least one illumination unit may include (i) a voltage-drop element and (ii) a shunt configured to (a) prevent voltage drop across the voltage-drop element when the one or more light-emitting elements of the illumination unit are present on the lightsheet, and (b) upon removal of the one or more light-emitting elements of the illumination unit, cause a voltage drop across the voltage-drop element. The shunt may be configured to be at least partially removed upon removal of the one or more light-emitting elements of the illumination unit, thereby causing the voltage drop across the voltage-drop element. The voltage drop across the voltage-drop element may be approximately equal to a voltage drop across the one or more light-emitting elements of the illumination unit when the one or more light-emitting elements of the illumination unit are present on the lightsheet. The voltage-drop element may include, consist essentially of, or consist of one or more resistors.

The substrate may be flexible. Along each illumination unit, a pitch at which the light-emitting elements are spaced may be substantially constant. A pitch at which the illumination modules are spaced across the substrate may be substantially constant. The lighting system may include a second lightsheet mechanically and/or electrically connected to the lightsheet. The lightsheet may include one or more connectors for mechanical and/or electrical connection to an adjoining lightsheet. At least one of the connectors may include, consist essentially of, or consist of a snap connector or a portion thereof. The lighting system may include a first snap connector electrically connected to the first electrical contacts, a second snap connector electrically connected to the second electrical contacts, and a second lightsheet. The second lightsheet may include, consist essentially of, or consist of a second substrate, third and fourth power conductors disposed on the second substrate, a plurality of second light-emitting elements disposed on the second substrate and electrically connected to the third and fourth power conductors, a third snap connector electrically connected to the third power conductor, and a fourth snap connector electrically connected to the fourth power conductor. The first snap connector may be configured for connection to the third snap connector, thereby electrically coupling the first electrical contacts to the third power conductor. The second snap connector may be configured for connection to the fourth snap connector, thereby electrically coupling the second electrical contacts to the fourth power conductor.

The lightsheet may define therethrough a hole. The hole may be defined by removal of one or more light-emitting elements of one or more illumination modules. The lightsheet may have a thickness in the range of 0.25 mm to 25 mm. The lighting system may include an optic disposed over at least a portion of the lightsheet. The optic may include, consist essentially of, or consist of a lens, a diffuser, a refractive optic, a reflective optic, a Fresnel optic, a fabric, a translucent material panel, a graphic panel, and/or a membrane. A collective thickness of the lightsheet and the optic may be in the range of 0.5 cm to 20 cm. The substrate may define a tab extending therefrom. A portion of the first and/or second power conductors may be disposed on the tab. The substrate may define first and second tabs extending therefrom. A portion of the first power conductors may be disposed on the first tab. A portion of the second power conductor may be disposed on the second tab. An optical characteristic of one or more of the illumination units may be different from a corresponding optical characteristic of one or more other illumination units. The optical characteristic may include, consist essentially of, or consist of correlated color temperature, color rendering index, R9, spectral power distribution, and/or spatial light intensity distribution.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "about," "approximately," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

Herein, two components such as light-emitting elements and/or optical elements being "aligned" or "associated" with each other may refer to such components being mechanically and/or optically aligned. By "mechanically aligned" is meant coaxial or situated along a parallel axis. By "optically aligned" is meant that at least some light (or other electromagnetic signal) emitted by or passing through one component passes through and/or is emitted by the other. Substrates, light sheets, components, and/or portions thereof described as "reflective" may be specularly reflective or diffusively reflective unless otherwise indicated.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1B:
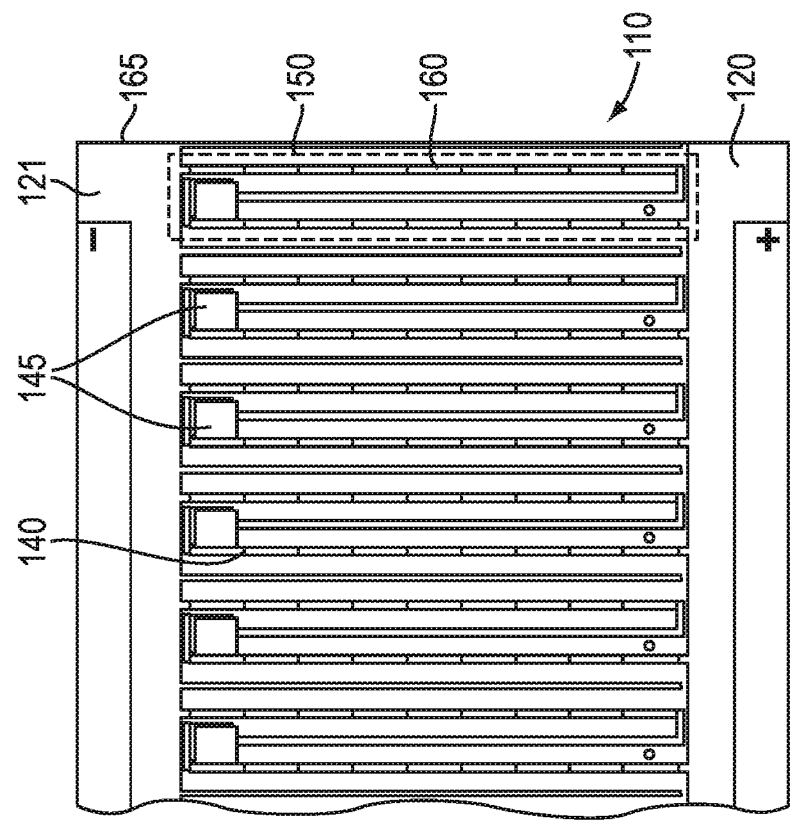
FIGS. 1A and 1B are, respectively, a circuit diagram and schematic of a lighting system.
Figure 1A:
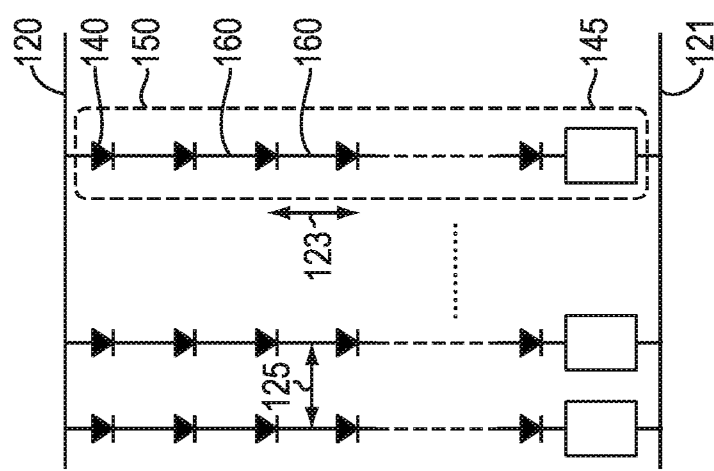
Figure 1C:
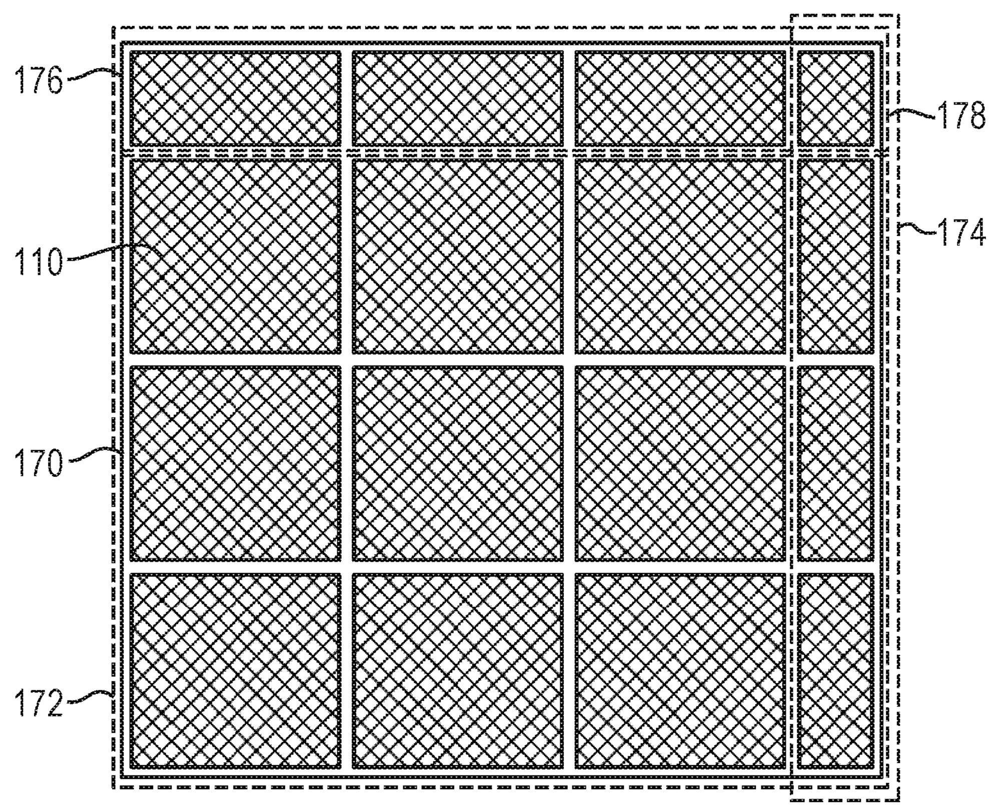
FIGS. 1C-1E are schematic illustrations of areas illuminated by lighting systems.
Figure 1E:
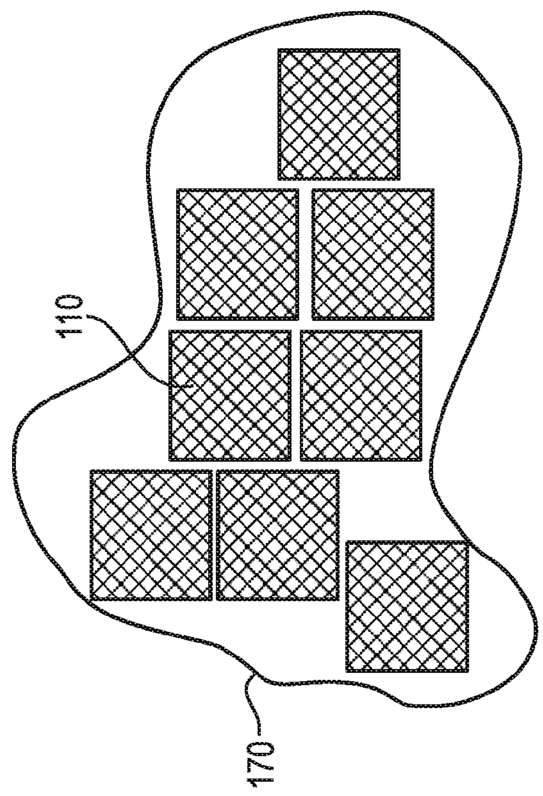
Figure 1D:
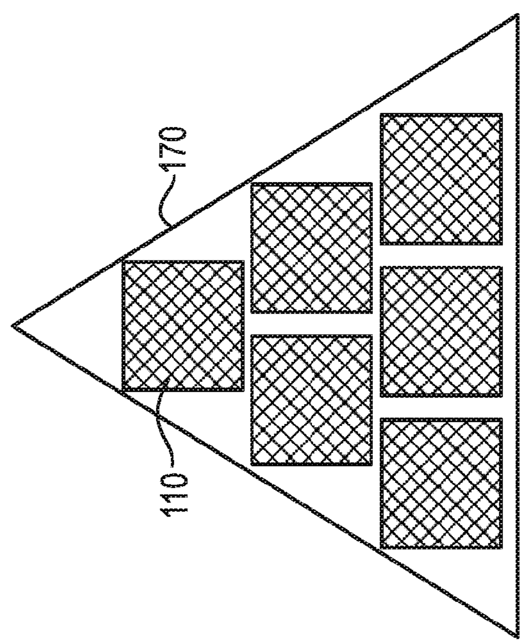
Figure 2A:
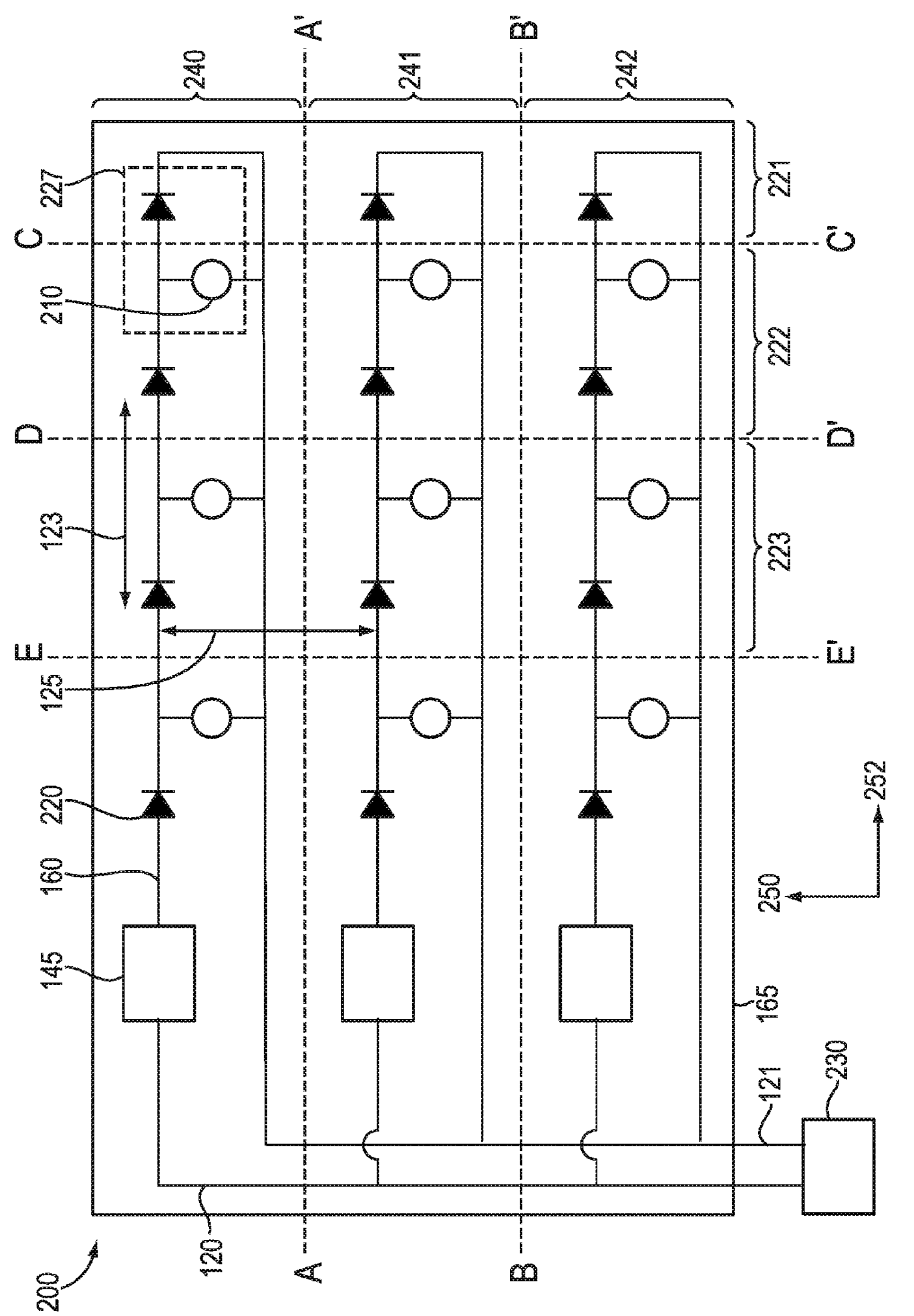
FIG. 2A is a circuit diagram of an illumination system in accordance with various embodiments of the invention.

FIG. 2A depicts an exemplary lighting apparatus 200 in accordance with various embodiments of the present invention. Lighting apparatus 200 includes substrate 165 on which are disposed conductive elements 160, power conductors 120, 121, control elements 145, light-emitting elements (LEEs) 220 and bypass elements 210. The circuit on substrate 165 may be powered by a power supply 230. Lighting apparatus 200 includes three strings 240, 241, 242 of series-connected LEEs 220; however, this is not a limitation of the present invention, and in other embodiments lighting apparatus 200 may include fewer or more strings. In FIG. 2A, each string contains four LEEs 220; however, this is not a limitation of the present invention, and in other embodiments each string of lighting apparatus 200 may include fewer or more LEEs 220. In FIG. 2A, strings 220 are electrically connected in parallel; however, this is not a limitation of the present invention, and in other embodiments strings 220 may have other electrical configurations. In various embodiments, LEEs 220 may be electrically connected in other configurations, for example parallel or a combination of series and parallel. In various embodiments of the present invention, each LEE 220 may represent one LEE or may represent a group of two or more LEEs, as will be discussed herein. While the description in reference to FIG. 2A describes one physical configuration (a substrate with conductive traces), this is not a limitation of the present invention and in other embodiments other physical configurations may be utilized.

Substrate 165 may be shortened (i.e., reduced in size) in a direction 250 by removing first string 240 (for example, by cutting along cut line A-A') and then string 241 (for example, by cutting along cut line B-B'). In various embodiments of the present invention, the size increment removed when each string removed is equal to or substantially equal to pitch 125. In various embodiments, pitch 125 may be in the range of about 3 mm to about 200 mm or pitch 125 may be in the range of about 5 mm to about 50 mm; however, this is not a limitation of the present invention, and in other embodiments other values of pitch may be utilized. This structure permits relatively fine control of the size increment when configuring sheet 165, as described herein.

Reduction of the size of sheet 165 in the perpendicular or substantially perpendicular direction 252 may be accomplished by removing first LEE group 221 (for example, by cutting along cut line C-C'), then by removing LEE group 222 (for example, by cutting along cut line D-D'), then removing LEE group 223 (for example, by cutting along cut line E-E'). When the first LEE group 221 is removed, it leaves an open circuit that is shunted by bypass element 210. The LEE(s) of a group and the associated bypass element may be referred to as an illumination unit, for example illumination unit 227, as shown in FIG. 2A. In various embodiments, the LEE(s) of an illumination unit is/are removed, while the associated bypass element of that illumination unit remains on the light sheet to complete the circuit, as is discussed herein. In various embodiments, bypass element 210 is or provides a high-impedance path (i.e., an open circuit or a substantially high resistance to current flow sufficiently high to prevent direct current flow between power conductors 120, 121) when the LEEs of group 221 are present, and is or provides a low-impedance path (i.e., a short circuit or substantially low resistance to current flow to enable direct current flow between power conductors 120, 121) when LEEs of group 221 are removed. In various embodiments of the present invention, a high-impedance path may have a resistance of at least about $10^5$ ohms or at least about $10^6$ ohms or at least about $10^8$ ohms. In various embodiments of the present invention, a low-impedance path may have a resistance of no greater than about 1000 ohms or no greater than about 100 ohms or no greater than about 10 ohms.

Figure 2B:
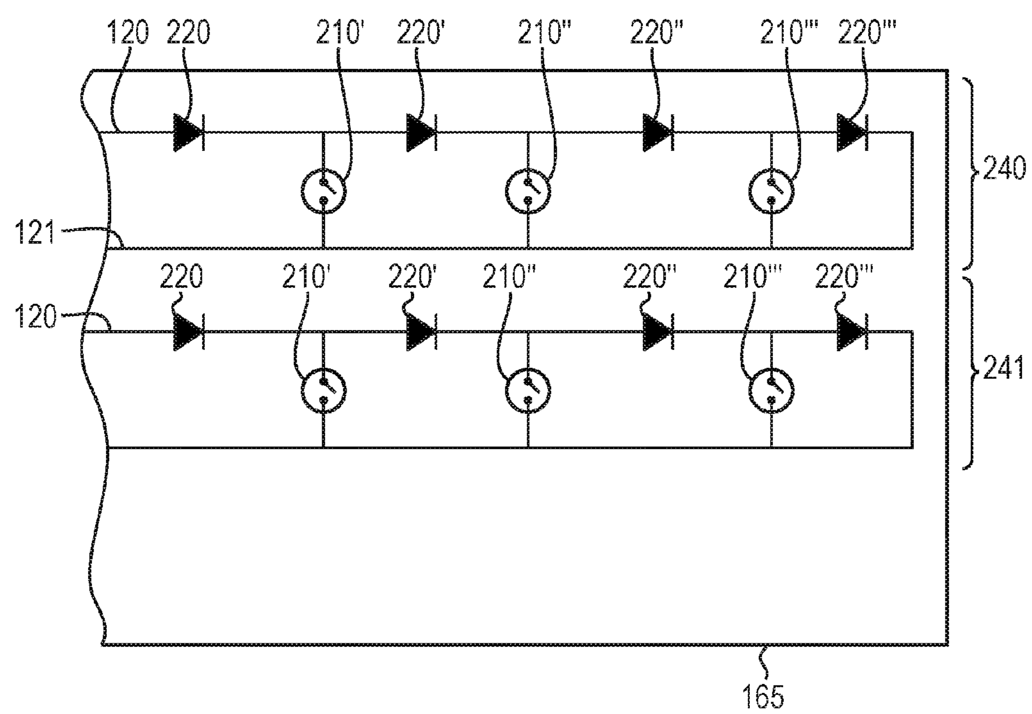
FIGS. 2B-2D, 3A, and 3B are partial circuit diagrams of illumination systems in accordance with various embodiments of the invention.

In various embodiments of the present invention, bypass element 210 may include or consist essentially of a switch. For example, bypass element 210 may include or consist essentially of a manually operated switch, for example a DIP switch that may in some embodiments be mounted on substrate 165. When an LEE or a group of LEEs is removed, the associated switch is closed, completing the circuit. For example, referring to FIG. 2B, if LEE 220''' is removed, then switch 210' is closed. Note that it is not necessary to remove all LEEs 220 in a group, for example group 221 or 222 in FIG. 2A (that is, it is not necessary to remove an LEE 220 from all strings in a group)—for example, LEE 220' may be removed from string 240 but not from string 241 (in this case bypass element 210' from string 240 would be closed but bypass element 210''' from string 241 would remain open.

Figure 2C:
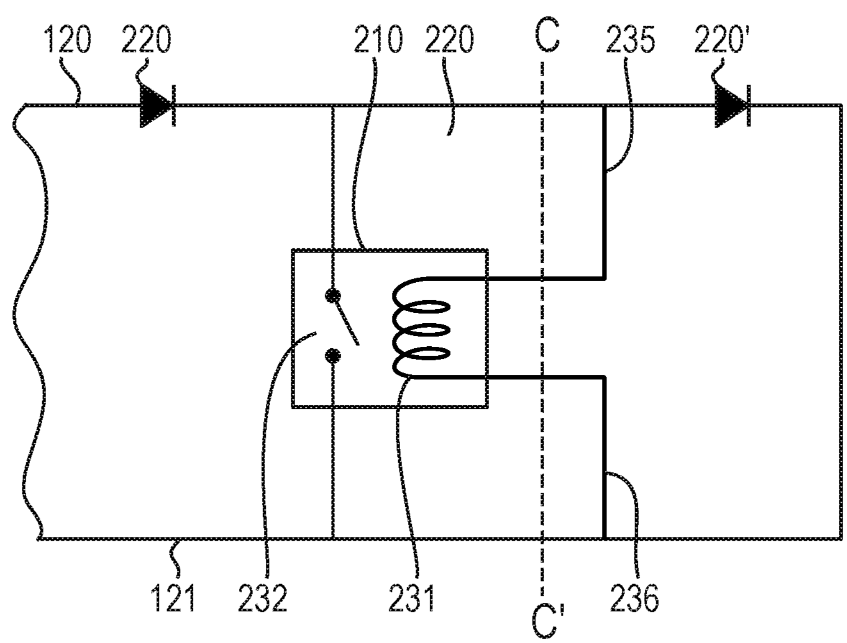

In various embodiments of the present invention, bypass element 210 may be automatically activated by the action of cutting or shortening the sheet. FIG. 2C shows an example of such an embodiment, in which bypass element 210 includes or consists essentially of a normally closed relay (only a portion of the circuit is shown for clarity). Relay 210 includes a switch 232 and a coil 231. Before cutting along cut line C-C' to remove LEE 220', coil 231 is energized by current flowing from wire 235 to the coil and returning to wire 236, thus holding switch 232 open, ensuring normal circuit operation. However, when LEE 220' is removed by cutting along cut line C-C', this also cuts wires 235 and 236, which de-energizes coil 231, permitting switch 232 to close, thus completing the circuit. As will be understood by those skilled in the art, the function performed by relay 210 may be accomplished by means other than a conventional relay, for example a solid-state relay or other solid-state components acting as a switch or substantially like a switch, for example transistors such as bipolar transistors and/or field-effect transistors, diodes, or the like. As will be understood by those skilled in the art, the circuit of FIG. 2C may include other components required for normal operation of well-known components. For example, in various embodiments, a means to limit the current through coil 231 may be included in series with coil 231. As utilized herein, the term "relay" encompasses not only relays but other devices or groups of devices exhibiting the functionality of a relay or switch.

Figure 2D:
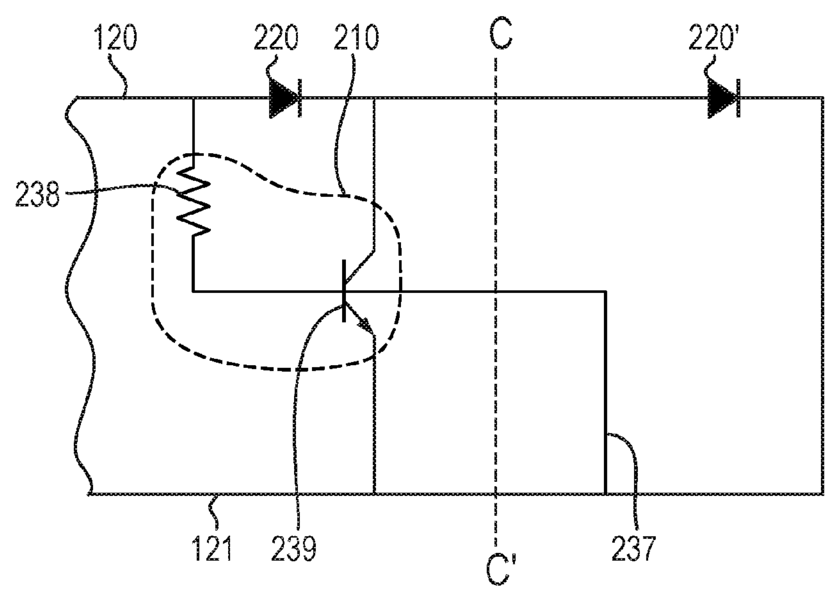

FIG. 2D shows an example of an embodiment of the present invention in which bypass element 210 includes or consists essentially of a transistor-based circuit. In this example bypass element 210 includes transistor 239 and resistor 238. Before cutting along cut line C-C' to remove LEE 220', the base of transistor 239 is tied to ground by wire 237, the base-emitter voltage (VBE) of transistor 239 is essentially zero, resulting in no current flow from the collector to the emitter, in essence an open circuit, thus ensuring normal circuit operation. However, when LEE 220' is removed by cutting along cut line C-C', this also cuts wire 237, which removes the short across the base and emitter of transistor 239. VBE increases by virtue of current flowing through resistor 238, turning on transistor 239 which then acts like a closed switch, completing the circuit.

Figure 3A:
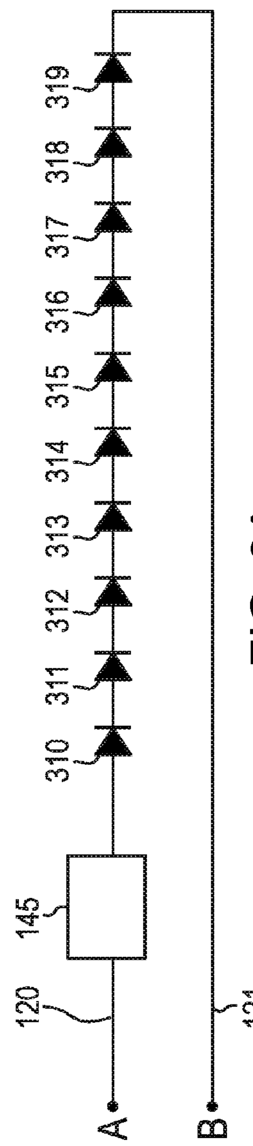

In various embodiments of this approach, removing one or more LEEs 220 may result in a reduction in the string voltage, i.e., the voltage of the series-connected string of LEEs 220. FIG. 3A shows a schematic of one string of an exemplary lighting system including current control element 145 and 10 LEEs 310-319. The voltage between points A and B is given by the sum of the voltage drop across current control element 145 and the voltage drop across LEEs 310-319, for example VCCE+n×VLEE, where VCCE is the voltage drop across current control element 145, n is the number of LEEs in series, and VLEE is the voltage drop across each LEE. In various embodiments, each LEE may include or consist essentially of a light-emitting diode (LED), and VLEE thus may represent the forward voltage Vf of the LED at the operating current. For the present discussion it is assumed that each LEE or LED has the same VLEE or Vf respectively; however, in various embodiments, VLEE or Vf may have a range of values, for example because of manufacturing variations, component aging, temperature variations across the components, or the like. In various embodiments, different LEEs may have different Vf because they have different bandgaps and/or turn-on voltages.

Figure 3B:
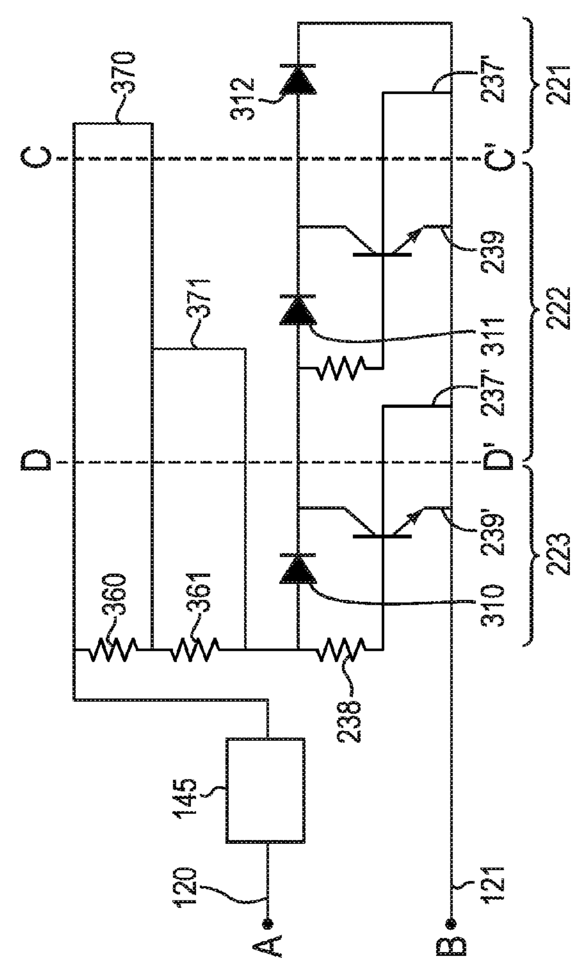

When one or more LEEs are removed from the circuit, the string voltage decreases. For a constant-voltage system, in which, for example, a constant voltage is applied between points A and B in FIG. 3A, it is desired that the string voltage remain constant or substantially constant even when one or more LEEs are removed from the circuit. In various embodiments of the present invention, the additional voltage (that is, the forward voltage of the removed LEEs) may be taken up across current control element 145. FIG. 3B shows an exemplary embodiment of the present invention in which a resistor takes up the additional voltage. FIG. 3B also includes the transistor-based bypass circuit discussed in reference to FIG. 2D. The value of resistors 360 and 361 is selected to generate the same or substantially the same voltage across the resistor at the operating current as is dropped across the LEE. Resistor 360 is shunted by loop 370, while resistor 361 is shunted by loop 371. Loop 370 and 371 are spatially located on the sheet or substrate so that the loop is cut when an associated portion of the circuit is removed. When the loop is cut, the shunt around the resistor is removed and current flows through the resistor, creating the additionally required voltage drop. For example, when a cut is made at cut line C-C' to shorten the sheet by removing LEE 312, this opens loop 370, permitting current to flow through resistor 360, which generates the same or substantially the same voltage as was dropped across LEE 312, and thus keeps the string voltage constant or substantially constant. Cutting across cut line C-C' also opens wire 237, causing transistor 239 to turn on, thus completing the circuit. Similarly, if a cut is made at D-D' to remove both LEEs 311 and 312, both loops 370 and 371 are cut, forcing current to flow through both resistors 360 and 361, which then generate the same voltage or substantially the same voltage as was dropped across LEEs 311 and 312, thus keeping the string voltage constant or substantially constant. Cutting across cut line D-D' also opens wire 237', causing transistor 239' to turn on, thus completing the circuit. The values of the resistors 360 and 361 may be determined by well-known techniques using the driving current value for the LEE and the forward voltage of the LEE at that current value, for example using Ohm's Law.

Figure 4A:
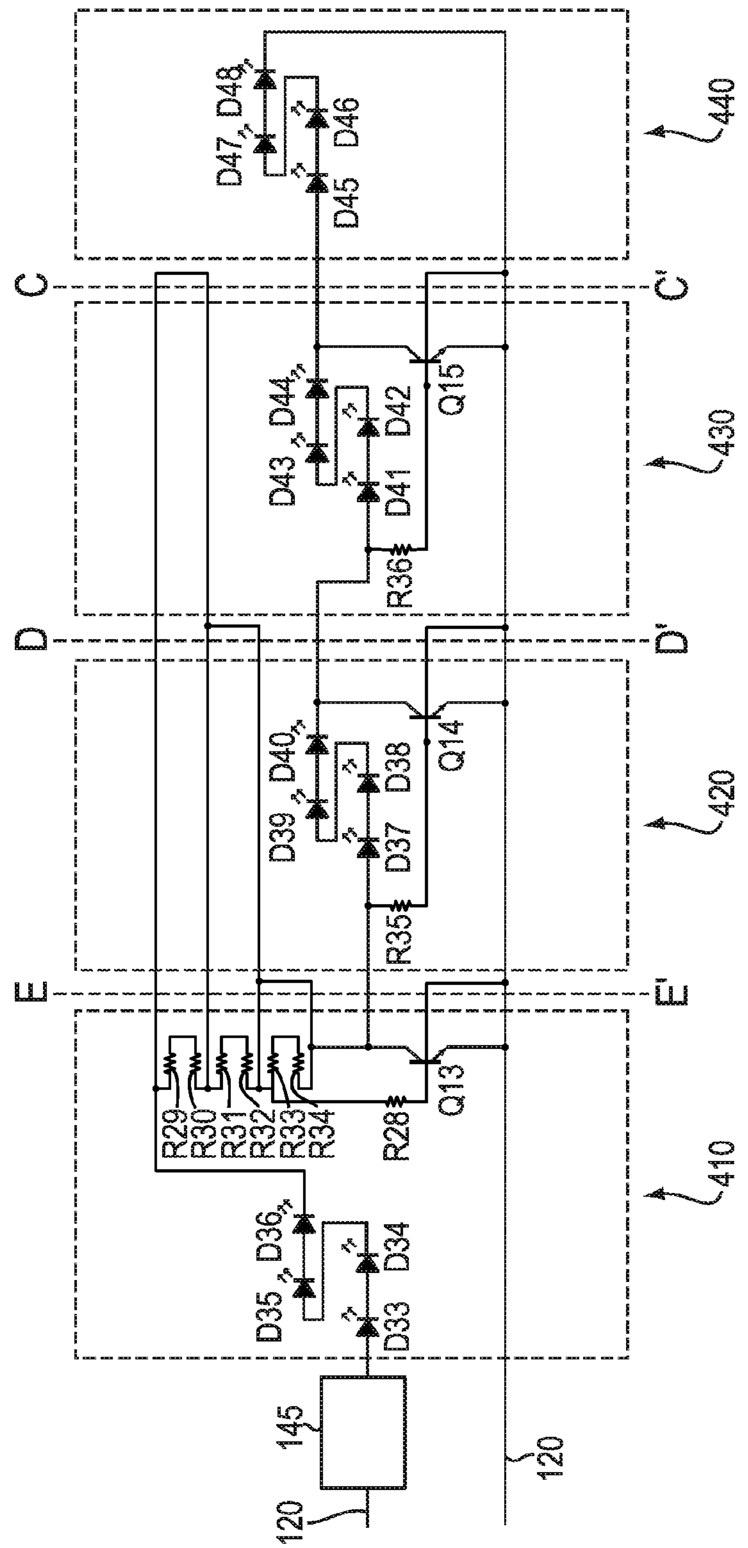
FIGS. 4A-4G and 5 are circuit diagrams of illumination systems in accordance with various embodiments of the invention.

FIG. 4A is a schematic of an embodiment of one string of an exemplary circuit of the present invention. In this schematic, each LEE 220 of FIG. 2A includes or consists essentially of four LEDs, and resistor 360 of FIG. 3B includes or consists essentially of two resistors. The circuit of FIG. 4A includes four groups 410-440, each of which may be individually removed. Cutting between groups 430 and 440 (cut line C-C') removes LEDs D45-D48, cutting between groups 420 and 430 (cut line D-D') additionally removes LEDs D41-D44, and cutting between groups 410 and 420 (cut line E-E') additionally removes LEDs D37-D40.

In various embodiments, more than one resistor may be utilized to produce the voltage drop when one or more LEEs is removed. In various embodiments, more than one resistor may be used to distribute the heat generated in the resistor across a larger portion or area of the sheet or substrate, if necessary.

Figure 4B:
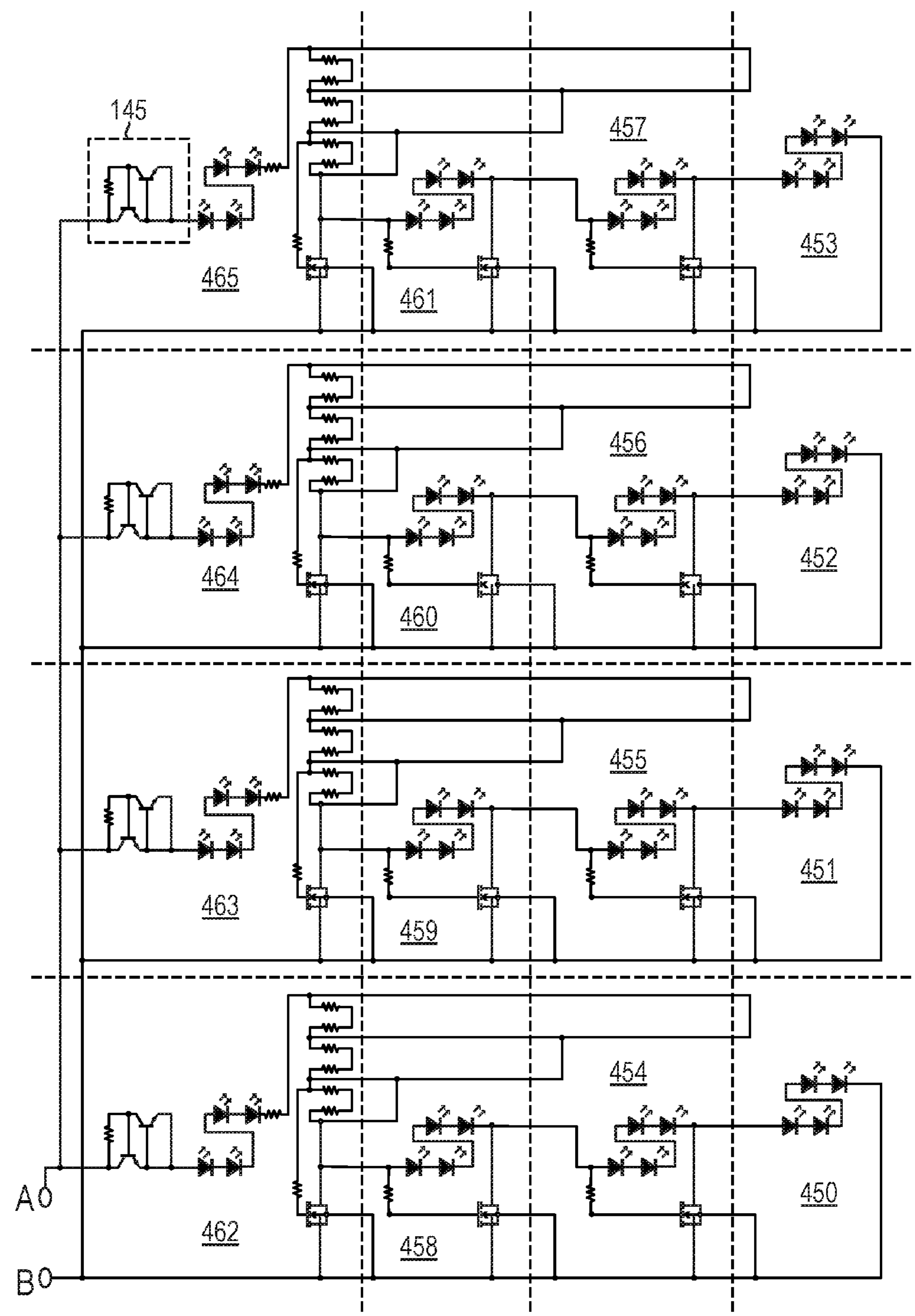
Figure 4C:
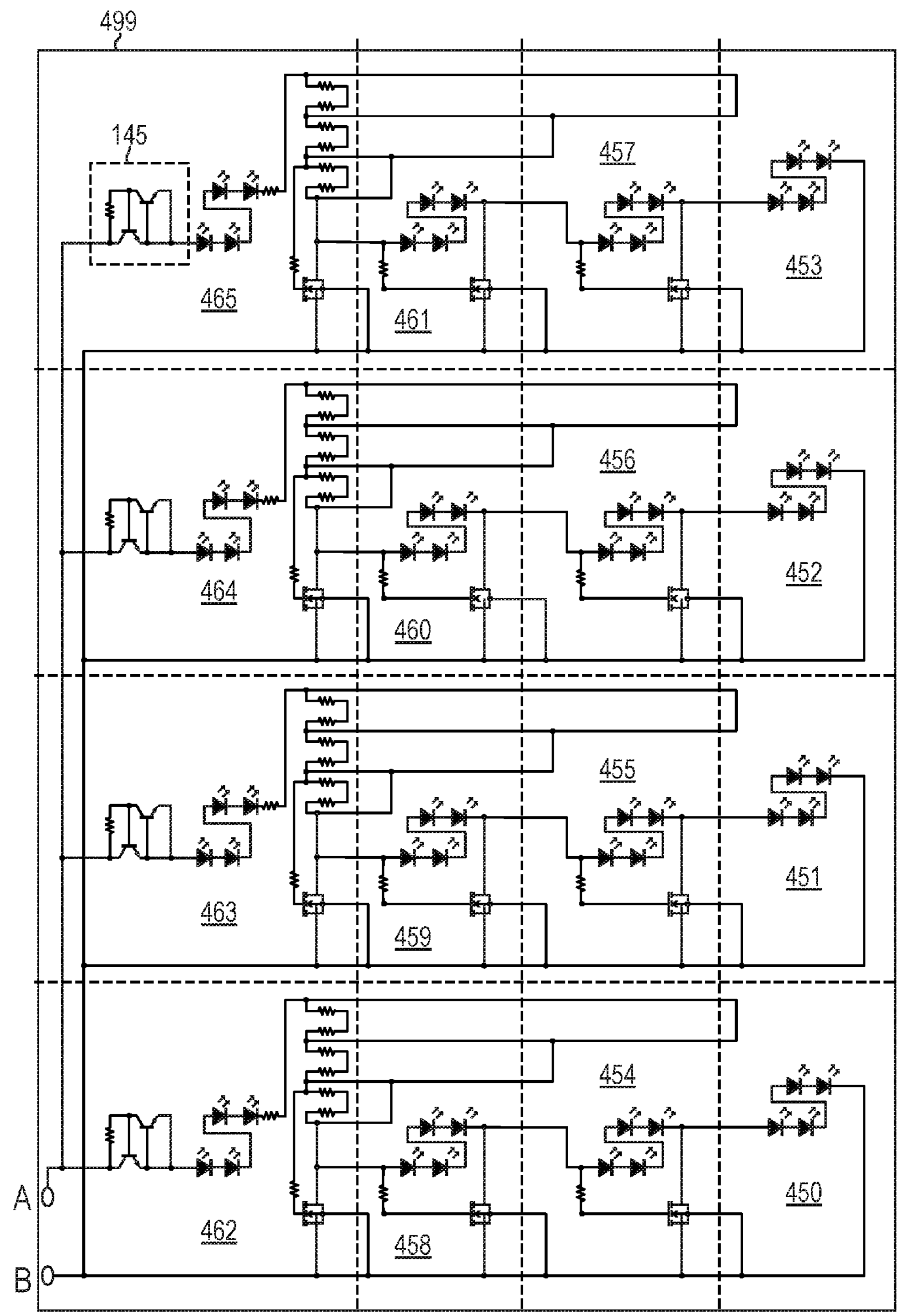

FIG. 4B shows a schematic of an exemplary panel or tile including a 4×4 grid of LEEs numbered 450-465. Each grid element includes four individual LEEs; however, this is not a limitation of the present invention, and in other embodiments each grid element may include fewer or more LEEs. In the example shown in FIG. 4B, current control element 145 includes a two-transistor, two-resistor circuit, for example as described in the '807 and '027 applications. In various embodiments, this circuit is designed to be operated at a constant voltage, which is applied between terminals A and B. While FIG. 4B shows an exemplary system having a 4×4 grid or array of LEEs, this is not a limitation of the present invention, and in other embodiments systems of the present invention may have other configurations, for example 5×5 or 4×5 or any number of groups of LEEs. While FIG. 4B shows an exemplary system having a rectilinear array of grids, i.e., organized in an arrangement of orthogonal or substantially orthogonal dimensions, this is not a limitation of the present invention, and in other embodiments other configurations, for example triangular or hexagonal or any arbitrary configuration may be utilized. In one exemplary embodiment of the present invention, the circuit of FIG. 4B is designed to operate at a voltage in the range of about 56 to about 60 V, which is applied to terminals A and B; however, in other embodiments the system may be designed to operate at a different voltage or within a different voltage range. The circuit is designed to fit on a panel or substrate 499 having a substantially square shape, for example as shown in FIG. 4C; however, this is not a limitation of the present invention, and in other embodiments the panel or substrate may have a different shape, and in different embodiments the circuit may be designed to operate within different voltage ranges. In various embodiments, the panel may be square and have a side dimension in the range of about 250 mm to about 1000 mm, or in the range of about 150 mm to about 250 mm; however, the size of the panel is not a limitation of the present invention. In various embodiments of the present invention, the panel, including LEEs and optional other components (for example current control elements), may have a thickness in the range of about 0.25 mm to about 25 mm, or in the range of about 0.5 mm to about 5 mm. In this example, four separate strings are mounted on each panel. The first string occupies grid elements 462, 458, 454, and 450, the second string occupies grid elements 463, 459, 455, and 451, the third string occupies grid elements 464, 460, 456, and 452, and the fourth string occupies grid elements 465, 461, 457, and 453. In various embodiments, LEEs 220 each include or consist essentially of LEDs, for example LEDs that emit in a variety of wavelength ranges, for example red, green, blue, amber, violet, ultraviolet, infrared, or the like. In various embodiments, LEEs 220 may include or consist essentially of phosphor-converted LEDs, for example that emit white light or substantially white light, for example having a correlated color temperature in the range of about 1500K to about 10,000K, each of which may have $V_f$ in the range of about 2.5 V to about 3.5 V, or in the range of about 2.7 V to about 3.1 V. In various embodiments, LEEs or LEDs may emit in any wavelength range or region and may have a $V_f$ appropriate to the bandgap of the LED or LEE. The voltage from each grid element is compensated for by two resistors, as discussed herein. The tile or sheet may have one or more portions removed to adjust its size to provide improved and/or customized fit during installation.

Figure 4D:
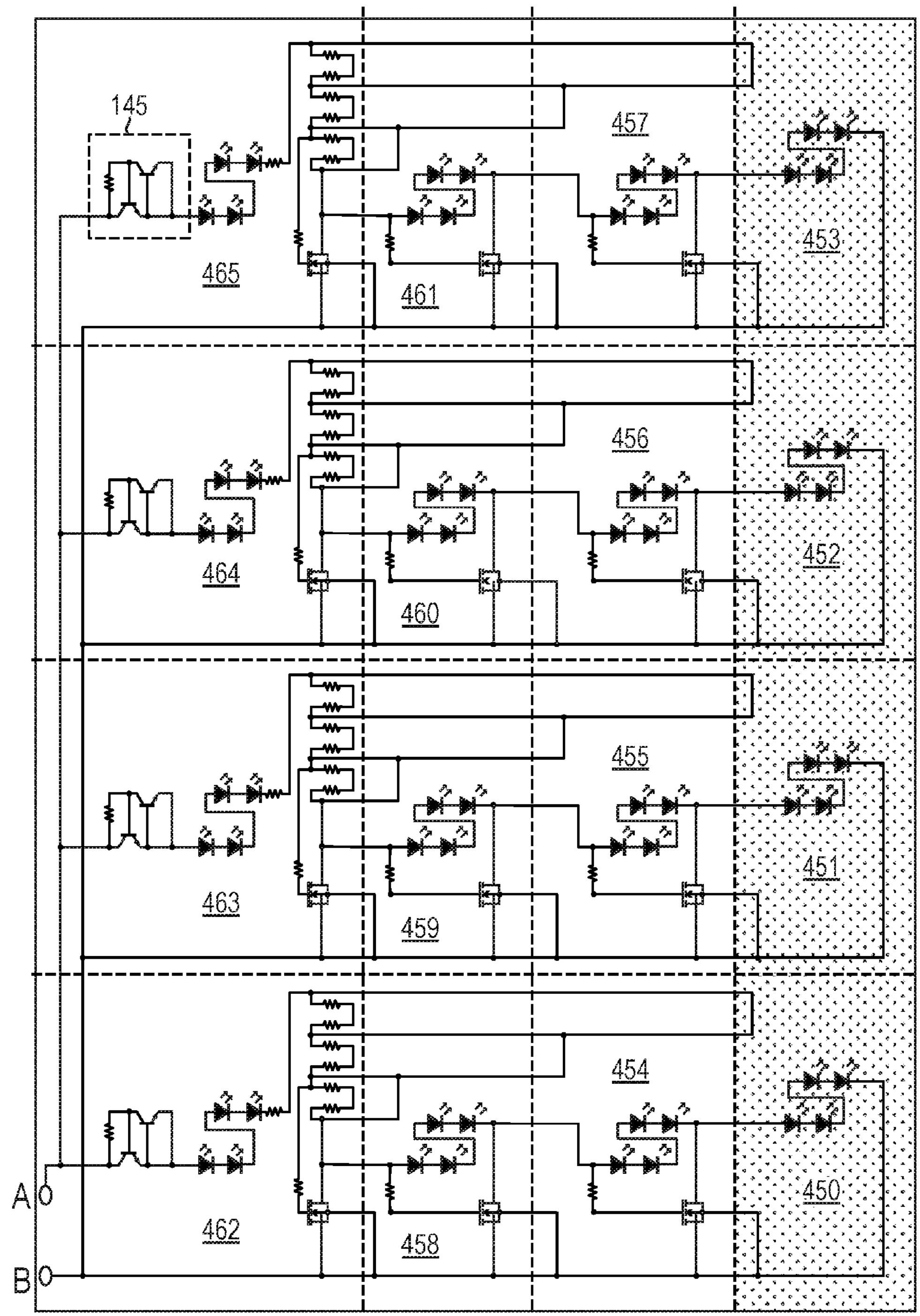
Figure 4E:
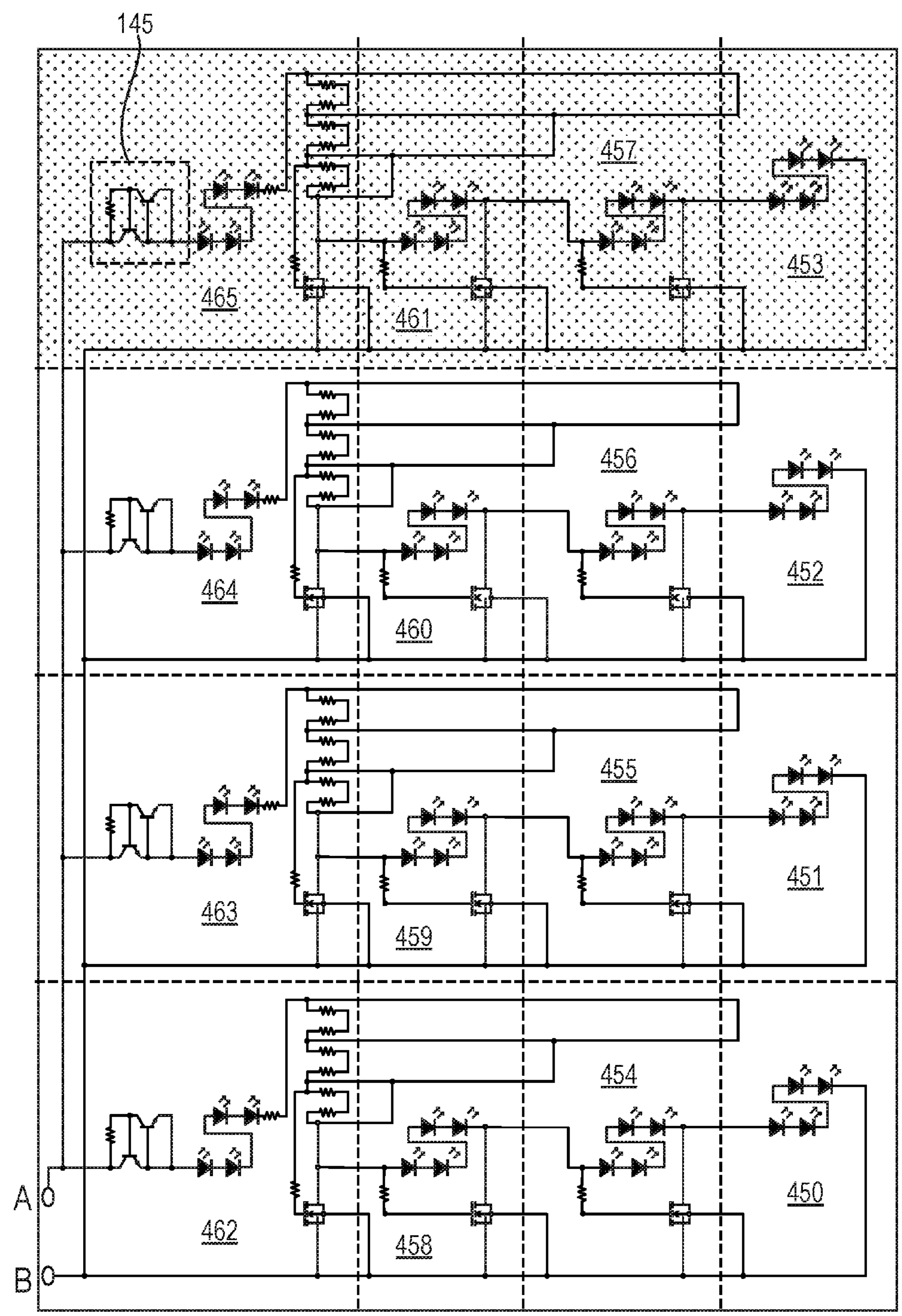

For example, FIG. 4D shows the tile being reduced in width by one grid element, by removing grids 453, 452, 451, and 450 (in FIGS. 4D-4G the removed grids are darkened). The tile may be reduced further in width, for example by removing grids 457, 456, 455, and 454, and further by removing grids 461, 460, 459, and 458. FIG. 4E shows the tile being reduced in height by one grid element, by removing grids 453, 457, 461, and 465. The tile may be reduced further in height, for example by removing grids 452, 456, 460, and 464 and further by removing grids 451, 455, 459, and 463.

Figure 4F:
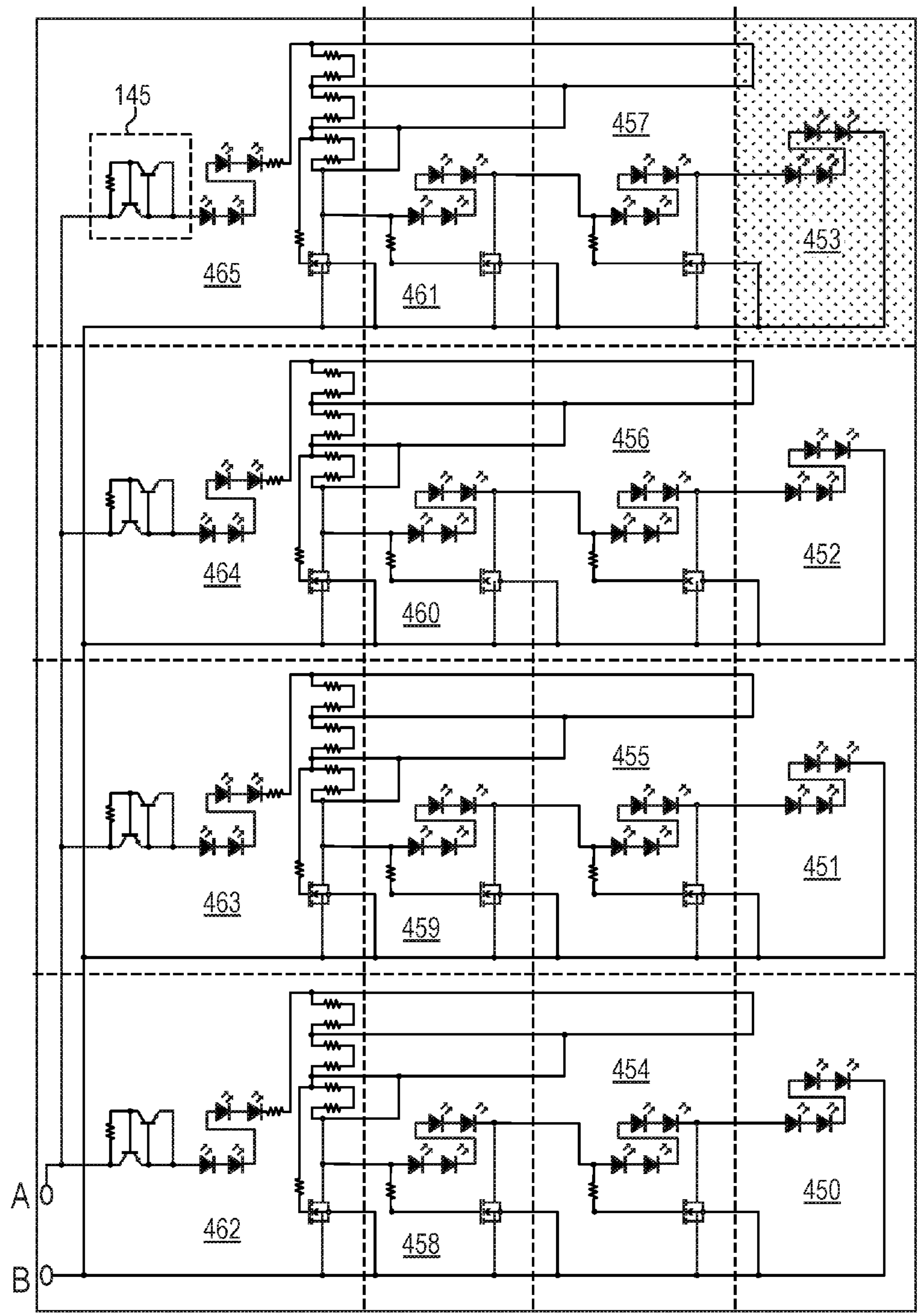
Figure 4G:
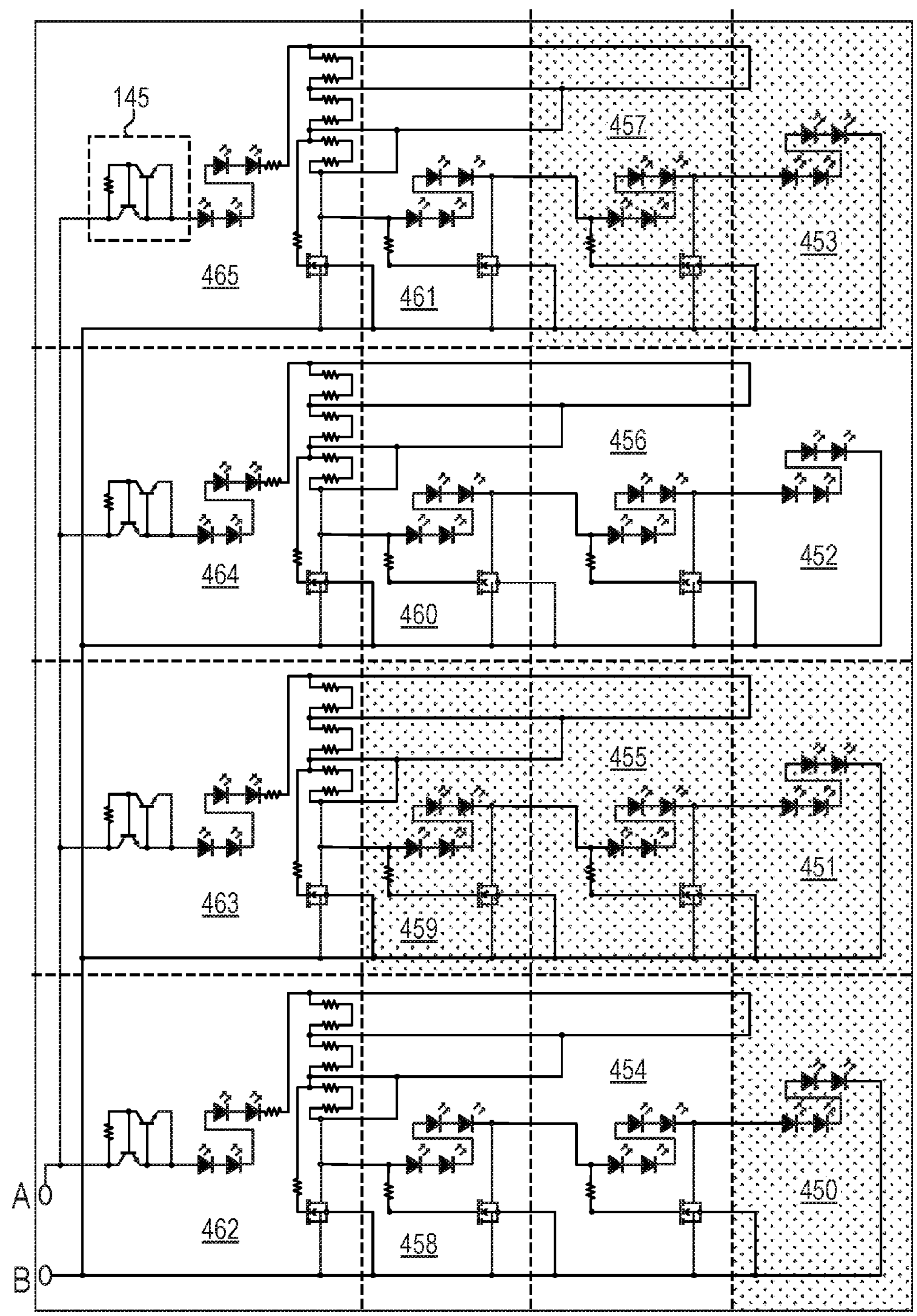

While FIGS. 4D and 4E show an entire row or column being removed, this is not a limitation of the present invention, and in other embodiments less than an entire row or column may be removed. For example, FIG. 4F shows a system with only grid 453 removed, while FIG. 4G shows grids 450, 451, 455, 459, 453, and 457 removed. FIGS. 4B-4G show only one example of a design with several different options for removing grids, but embodiments of the present invention include designs with fewer or more grids and the ability to remove grids not shown as removed in FIGS. 4B-4G.

Figure 5:
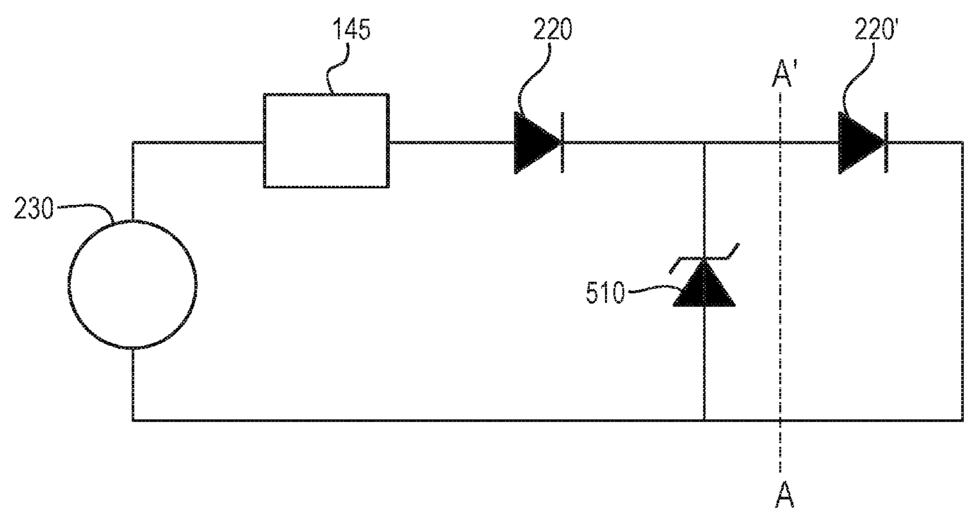

In various embodiments of the present invention, bypass element 210 may include or consist essentially of a Zener diode or a similar Zener-based protection device, for example Littelfuse PLED series devices. FIG. 5 shows a simplified circuit incorporating a Zener diode 510, power supply 230, current control device 145 and two LEEs 220 and 220'. The circuit of FIG. 5 is a simplified circuit and actual embodiments may have more components or different electrical topologies, as required and/or as discussed herein. In various embodiments of the present invention, Zener diode 510 is selected to have a breakdown voltage greater than the forward voltage of LEE 220'. Thus, when LEE 220' is in the circuit, all or substantially all the current flows through LEE 220' because the voltage across Zener diode 510 is less than the breakdown voltage, thus no or virtually no current flows through Zener diode 510. However, when LEE 220 is removed from the circuit (for example by cutting along cut line A-A'), the voltage from power supply 230 may increase to drive the current to the desired value. When the voltage increases to a value larger than the breakdown voltage of Zener diode 510, it will conduct current and complete the circuit. Current regulator 145 may control the current to the desired or substantially desired value; however, with Zener diode 510 in the circuit (replacing LEE 210') the voltage supplied by power supply 230 may be higher than without Zener diode 510 replacing LEE 210', for example by an amount about equal to the difference between the Zener breakdown voltage of Zener diode 510 and the forward voltage of LEE 210'.

In various embodiments of the present invention, a panel or substrate may be divided into a number of segments (or grid elements similar to those described in reference to FIGS. 2A and 4B), where each grid segment or grid element contains one string of LEEs and cutting or separation removes one or more complete strings. In addition, the embodiment discussed in reference to FIG. 5 and similar embodiments permit removal of a portion of a string.

Figure 6A:
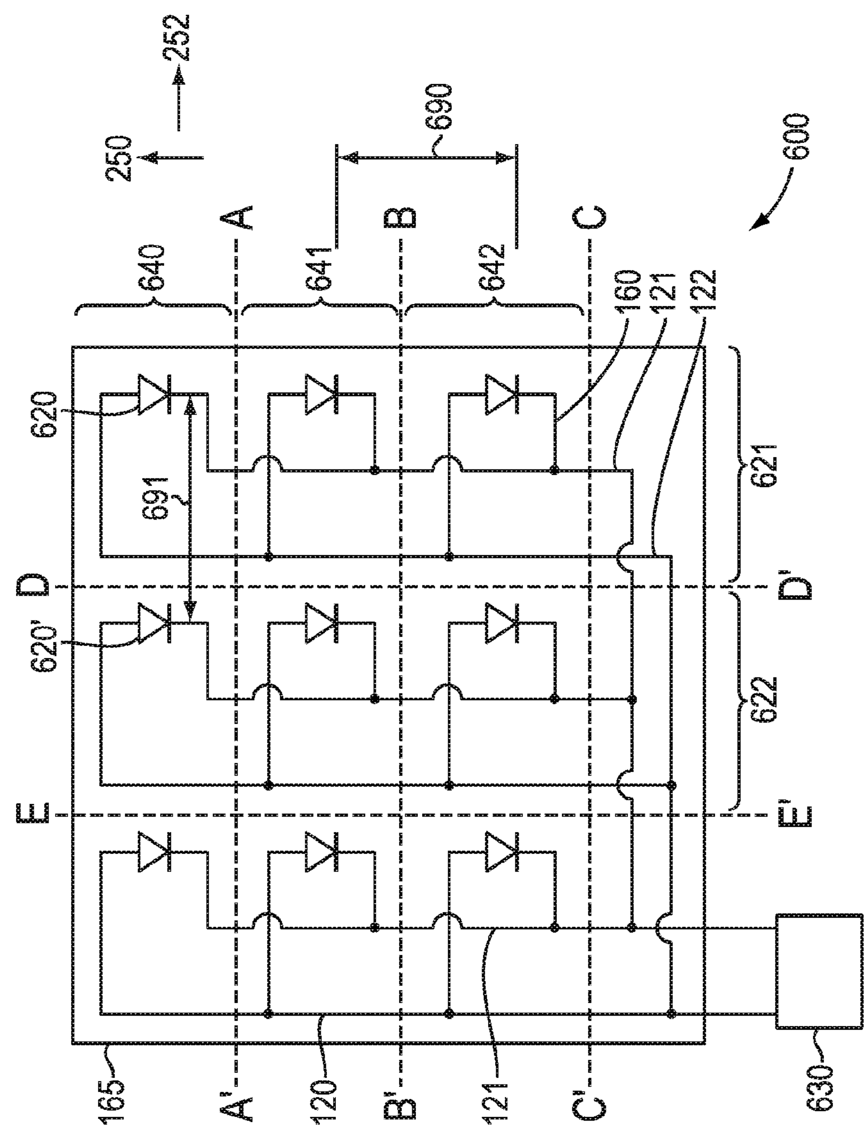
FIG. 6A is a circuit diagram of an illumination system in accordance with various embodiments of the invention.

FIG. 6A depicts an exemplary lighting apparatus 600 in accordance with various embodiments of the present invention. Lighting apparatus 600 includes substrate 165 on which are disposed conductive elements 160, power conductors 120, 121 and LEEs 620. The circuit on substrate 165 is powered by power supply 630. Lighting apparatus 600 includes a 3×3 array of LEEs 620; however, this is not a limitation of the present invention, and in other embodiments lighting apparatus 600 may include fewer or more LEEs 620. In various embodiments, each LEE 620 may include or consist essentially of one or more individual LEEs. In various embodiments, each LEE 620 may include or consist essentially of one or more individual LEEs and one or more control elements, for example a current-control element, or one or more other components, as will be discussed herein.

Substrate 165 may be shortened in the direction 250 by removing LEEs 620 in row 640 (for example, by cutting along cut line A-A') and then further shortened by removing LEEs 620 in row 641 (for example, by cutting along cut line B-B'). In various embodiments of the present invention, the size increment removed when each string removed is equal to or substantially equal to an LEE pitch 690; however, this is not a limitation of the present invention, and in other embodiments the size increment may be different from pitch 690. In various embodiments, pitch 690 may be in the range of about 3 mm to about 200 mm or in the range of about 5 mm to about 50 mm; however, this is not a limitation of the present invention, and in other embodiments the pitch may have any value. This structure permits relatively fine control of the size increment when configuring sheet 165, as described herein. As discussed herein, in FIG. 6A each LEE 620 may include or consist essentially of one or more individual LEEs, in which case the pitch between each LEEs 620 and the cut increment may be different.

In addition to removing an entire row, a portion of a row may also be removed. For example, LEE 620' may be removed by cutting out the area bounded by the edge of substrate 165 and cut lines E-E', D-D', and A-A'. In this embodiment, portions of sheet 165 are preferably first removed from the top (in the region of cut line A-A') to ensure power is available to remaining LEEs 620. For example, if LEE 620 bounded by the edge of substrate 165 and cut lines A-A', D-D', and B-B' is removed, this will also cut power to LEE 620 situated above (that is bounded by cut lines A-A', D-D' and the edge of substrate 165). Thus, in various embodiments, LEEs 620 are preferably removed from the sheet 165 from the distal ends of the strings, i.e., the ends of the strings opposite the ends closest to power supply 630.

Reduction of the size of sheet 165 in the perpendicular or substantially perpendicular direction 252 may be accomplished by removing LEEs 620 in column 621, (for example, by cutting along cut line D-D') and then further reduced by removing LEEs 620 in row 622 (for example, by cutting along cut line E-E'). In various embodiments of the present invention, the size increment removed when each string removed is equal to or substantially equal to an LEE or string pitch 691; however, this is not a limitation of the present invention, and in other embodiments the size increment may be different from pitch 691. In various embodiments, pitch 691 may be in the range of about 3 mm to about 200 mm or in the range of about 5 mm to about 50 mm; however, this is not a limitation of the present invention, and in other embodiments the pitch may have any value. This structure permits relatively fine control of the size increment when configuring sheet 165, as described herein.

Figure 6B:
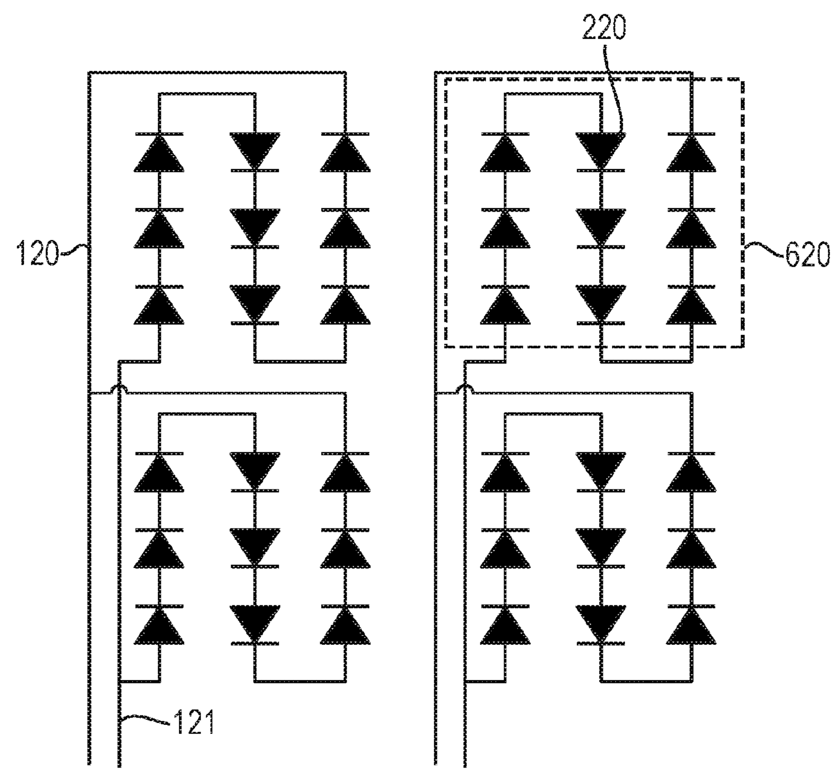
FIGS. 6B and 6C are partial circuit diagrams of illumination systems in accordance with various embodiments of the invention.
Figure 6C:
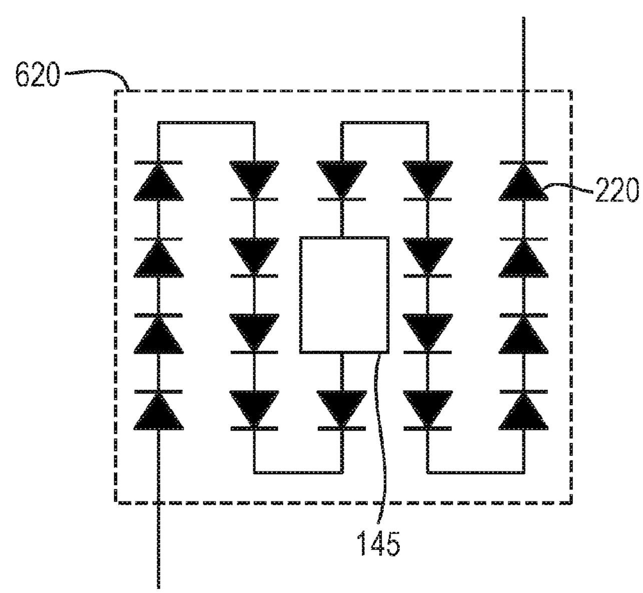

In various embodiments, each LEE 620 may include or consist essentially of a string of LEEs, for example LEEs 220 as described with reference to FIG. 2A. FIG. 6B shows an example of an embodiment of the present invention in which LEE 620 includes or consists essentially of nine LEEs 220 electrically connected in series. However, this is not a limitation of the present invention, and in other embodiments LEE 620 may include or consist essentially of any number of LEEs 220, and these may be connected in series, parallel, a combination of series or parallel or any other arrangement. In various embodiments LEE 620 may also include additional elements, for example resistors, capacitors, transistors, inductors, integrated circuits, or the like. FIG. 6C shows an example of LEE 620 that includes or consists essentially of 18 LEEs 220 and control element 145, all connected in series. As described with reference to FIG.

6A, when one LEE 620 is removed, this is equivalent to removing an entire string of LEEs 220 in FIG. 6B or 6C, instead of a portion of a string, as is the case with the circuit of FIG. 2A. An advantage of the approach described in reference to FIG. 6A is that a bypass element may not be required to complete the circuit after cutting or separation. While FIG. 6C shows control element 145 as part of LEE (or string) 620, in various embodiments, control element 145 may not be removed along with LEEs 220, while in other embodiments control element 145 may be removed along with LEEs 220.

Figure 6D:
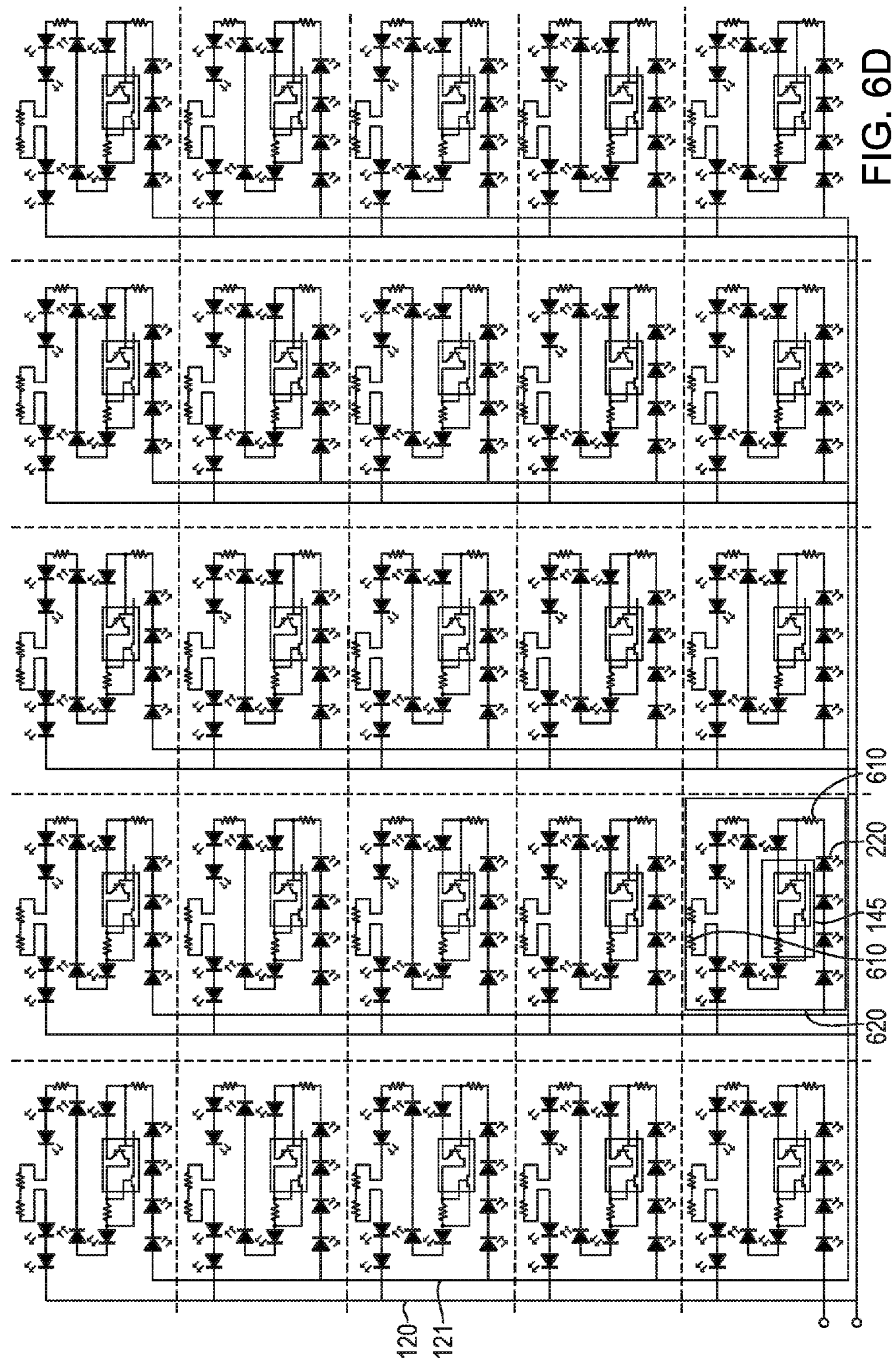
FIG. 6D is a circuit diagram of an illumination system in accordance with various embodiments of the invention.

FIG. 6D shows a schematic of an embodiment of the present invention of a structure in which each removable portion includes or consists essentially of one string. In FIG. 6D, cut lines are designated by dashed lines and each LEE 620 includes or consists essentially of 12 LEEs 220, control element 145, and resistors 610. In various embodiments of the present invention, resistors 610 may be included in the string to permit use of a string voltage larger than the voltage drop across LEEs 220 and control element 145. While in various embodiments this may reduce luminous efficacy, this approach may be utilized to control the number of LEEs 220 within the string or within LEE 620.

Figure 7A:
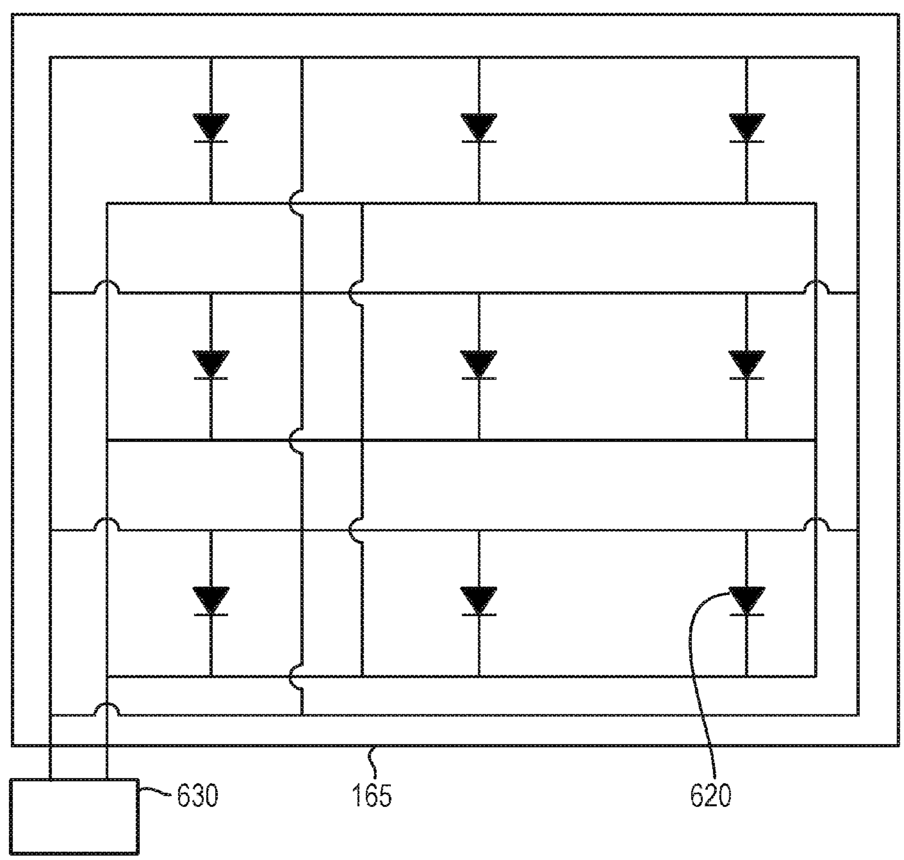
FIGS. 7A-7E are circuit diagrams of illumination systems in accordance with various embodiments of the invention.
Figure 7B:
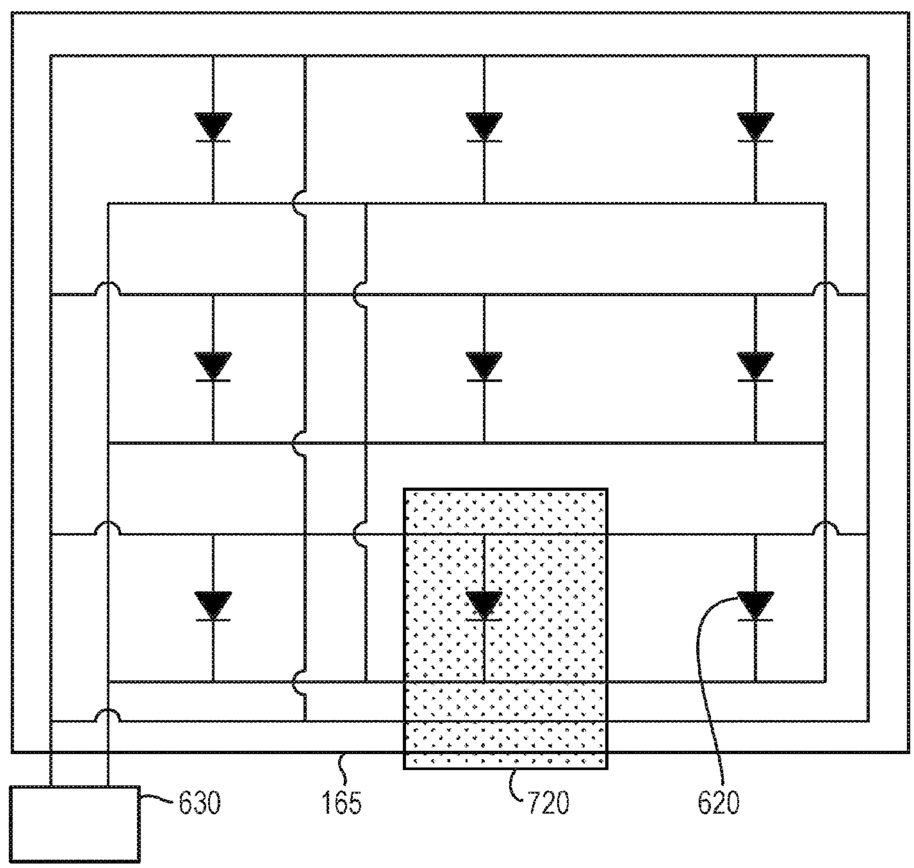
Figure 7C:
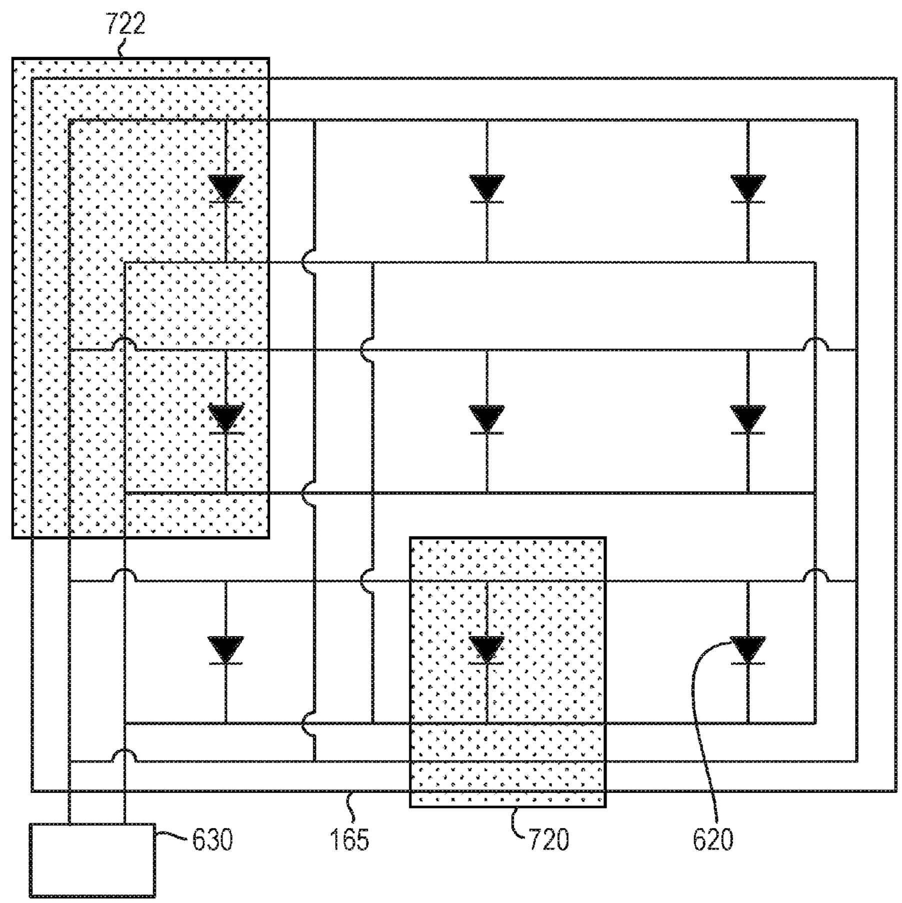
Figure 7D:
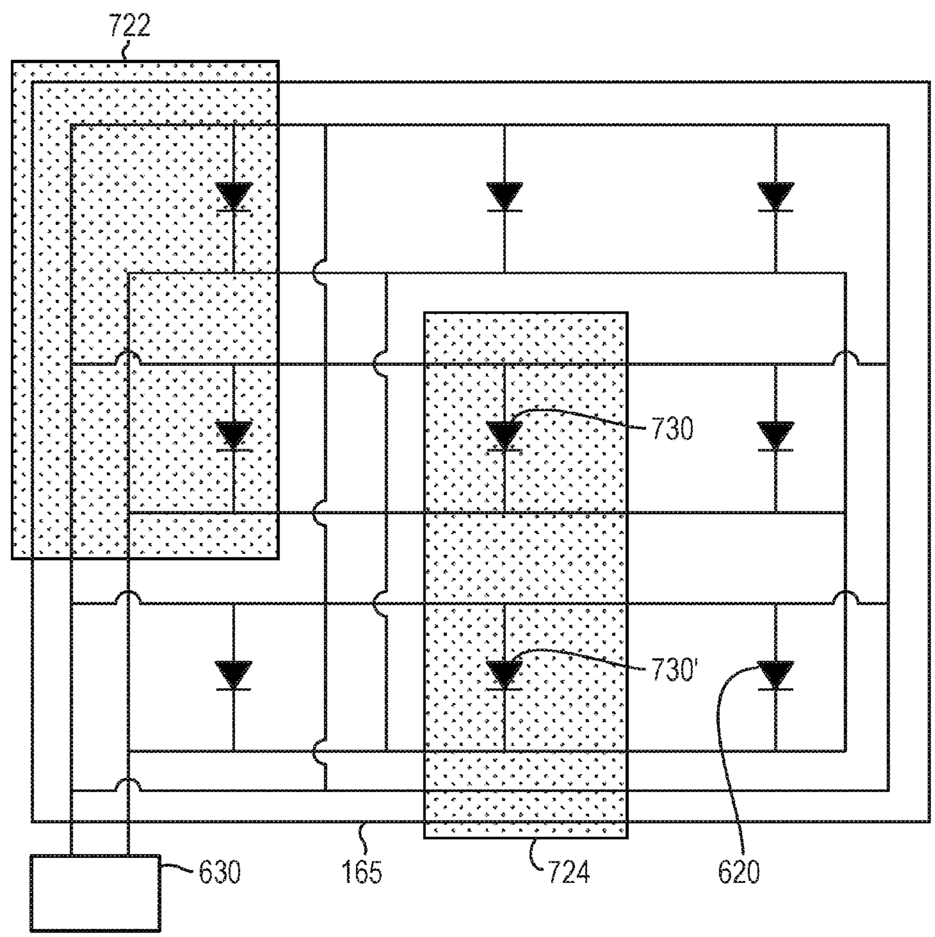
Figure 7E:
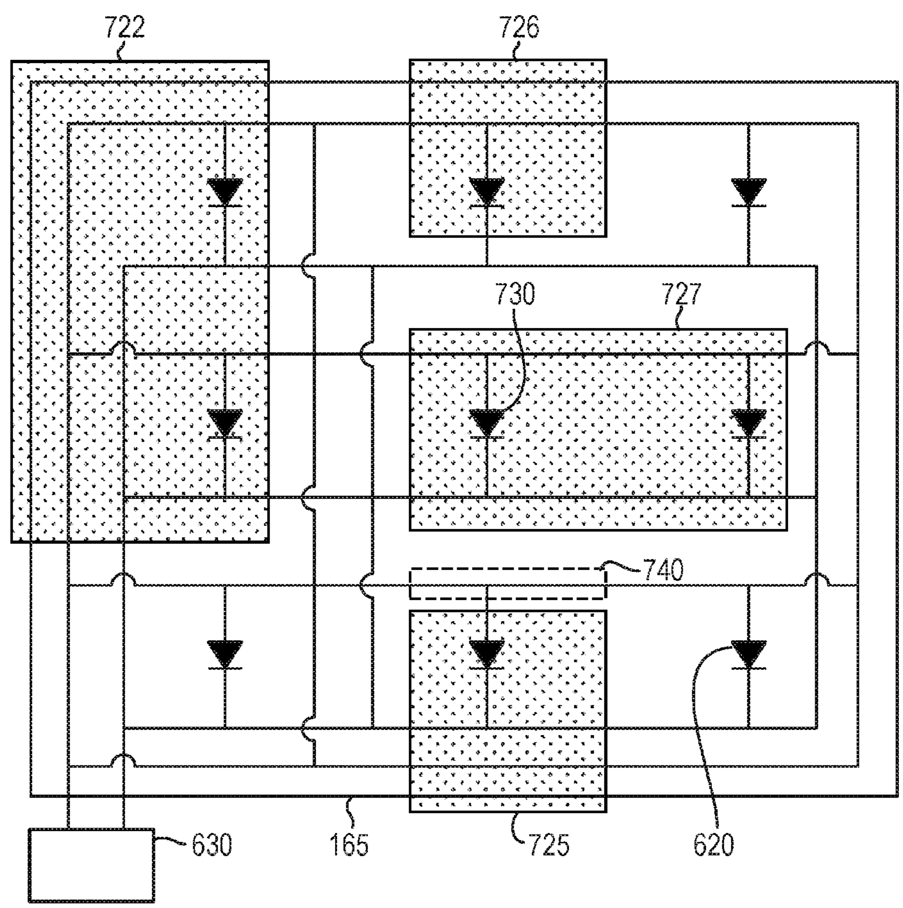

FIG. 7A shows a schematic of an embodiment of the present invention similar to that shown in FIG. 6A; however, in the structure of FIG. 7A, additional power conductors are added to permit arbitrary removal of an LEE 620, i.e., removal independent of its position on sheet 165. Specifically, the LEEs within each string of LEEs are directly connected to opposing power conductors and thus are connected in parallel to each other; removal of an interior LEE without removing one or more LEEs at the distal end of the string may be accomplished via removing the LEE without removing an associated portion of at least one of the power conductors connected to that LEE. FIG. 7B shows removal of a portion 720 (removed portion indicated by light grey square), while FIG. 7C shows removal of portions 720 and 722. Note that in FIGS. 7B and 7C the removed portions include removal of an edge portion of sheet 165 and removal only of LEEs 620 adjacent to the edge of sheet 165. FIG. 7D shows additional removal of LEE 730. In FIG. 7D removed portion 724 includes LEEs 730 and 730'. FIG. 7E shows removal of portions 722, 725, 726, and 727. In this case, portion 727 is in the interior of sheet 165, i.e., it does not include an edge of sheet 165. Note that portion 725 is different from portion 720 in FIG. 7A, as portion 725 does not include the conductive trace attached to LEE 730 in portion 725 (this portion of the conductive trace is encircled in a dashed area identified as 740 in FIG. 7E). In this fashion, multiple interior and edge or exterior regions may be removed from the sheet, for example to modify the shape of the sheet to fit a specific installation area, or to permit accommodation of various features in the installation environment, for example smoke detectors, fire sprinkler heads, heating, ventilation and air conditioning ducts and/or sensors, various other sensors or cameras or the like.

Figure 8A:
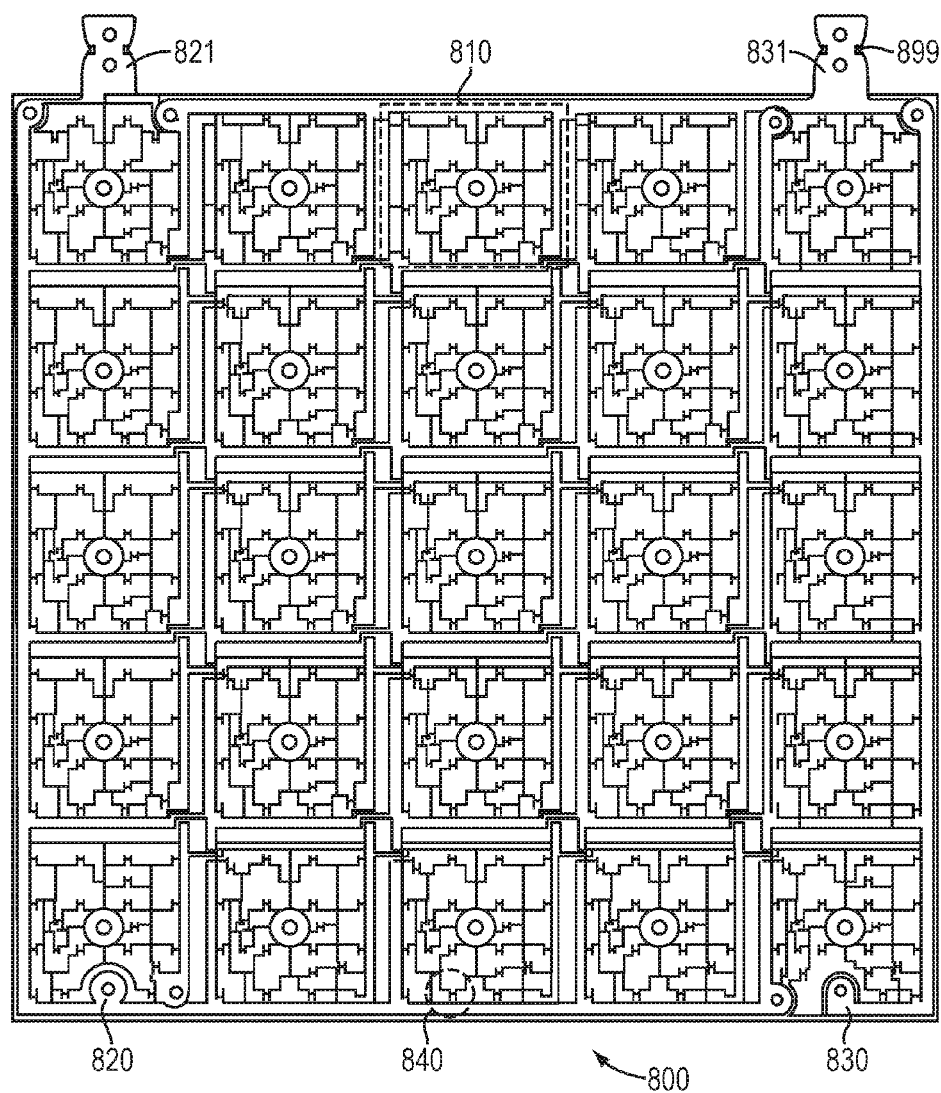
FIGS. 8A-8H are schematic diagrams of illumination systems in accordance with various embodiments of the invention.

FIG. 8A shows a schematic layout of an exemplary panel or tile including a 5×5 grid of LEE groups, similar to that described in reference to FIGS. 7A-7E. Lighting panel 800 (also referred to as a lighting tile, tile, or lighting unit) includes a 5×5 grid of LEE groups 810 and connector or connection regions 820, 821, 830 and 831. In various embodiments, one or more of the connectors or connector regions may be configured as a tab or extension to the body of the panel or tile. For example, FIG. 8A shows connector or connector regions 821 and 831 are disposed and/or configured on tabs or extensions 899. In various embodiments, connector regions 820 and 821 may be electrically coupled together by conductive traces on lighting panel 800 and connector regions 830 and 831 may be electrically coupled together by conductive traces on lighting panel 800. In various embodiments, one or more connectors, for example a snap connector (for example a connector having one of two parts that clip or snap together, e.g., a button and/or a button socket such as a 9V battery connector), slide connector, or other type of connector, may be electrically coupled to each connector region, permitting electrical and potentially mechanical coupling between multiple lighting panels 800. In various embodiments, lighting panel 800 may incorporate features and/or connectors as described in U.S. patent application Ser. No. 14/699,149, filed on Apr. 29, 2015 ("the '149 application"), the entire disclosure of which is incorporated by reference herein. In various embodiments, power may be supplied to lighting panel 800, for example to connector regions 820 and 830. In various embodiments power may be supplied to lighting system 800, for example to connector regions 821 and 831. In various embodiments, connector region 820 is electrically coupled to connector region 821 within lighting panel 800 and connector region 830 is electrically coupled to connector region 821 within lighting panel 800. In various embodiments, a second lighting panel 800 may be electrically connected to the first, for example connector regions 820 and 830 of the second lighting panel 800 may be electrically coupled to connector regions 821 and 831, respectively, of the first lighting panel 800, permitting transfer of power from connector regions 821 and 831 from the first lighting panel 800 to connector regions 820 and 830 of the second lighting panel 800.

Figure 8B:
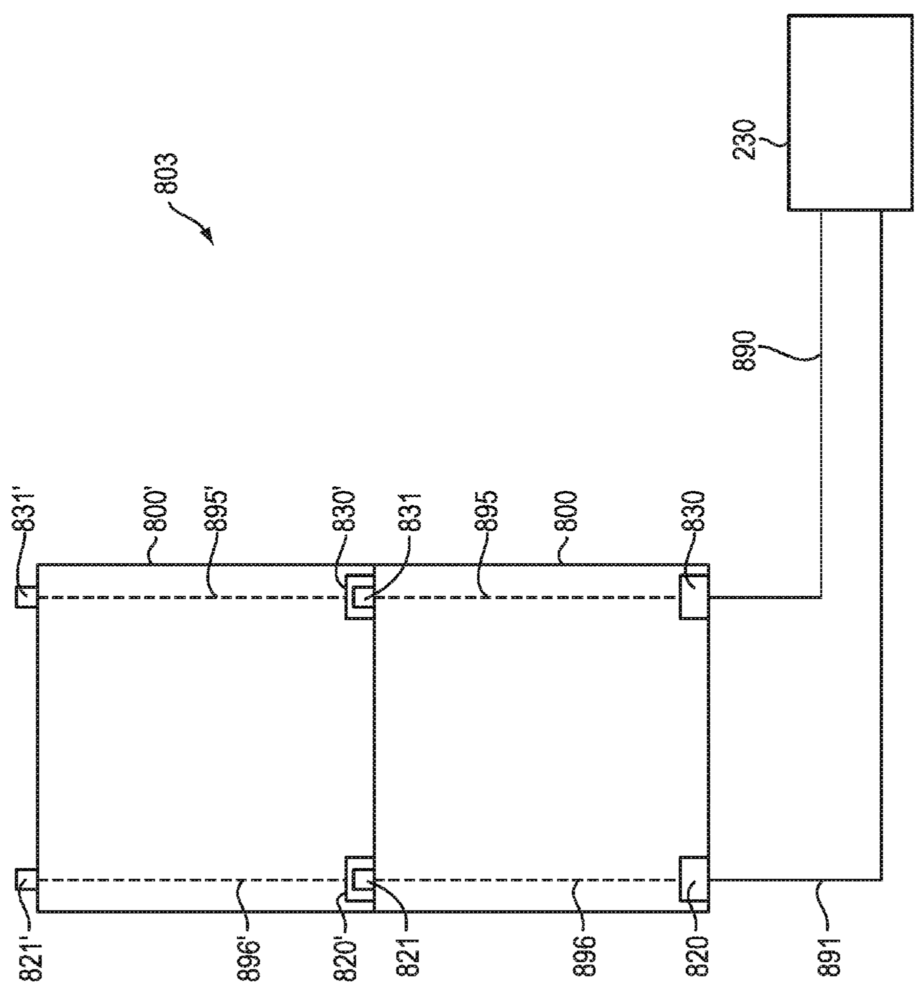

FIG. 8B shows a schematic of a lighting system 803 including two lighting units or panels 800, identified as 800 and 800', powered by power supply 230 that is electrically coupled to connector regions 820 and 830 through conductors 891 and 890 respectively; connector regions 821 and 831 of lighting unit 800 are electrically coupled to connector regions 820' and 830' of lighting unit 800'. In various embodiments, conductors 890 and 891 may be configured as part of a power distribution bus that includes or consists essentially of power distribution lines 890 and 891 and connectors (not shown in FIG. 8B for clarity) that electrically couple power distribution line 890 to connector or connector region 830 and that electrically couple power distribution line 891 to connector or connector region 820.

As connector region 820 is electrically coupled to connector region 821 and connector region 830 is electrically coupled to connector region 831, shown schematically by dashed lines 895 and 895' respectively, power is thus transferred from lighting unit 800 to lighting unit 800' without the need for additional power conductors between the two lighting units. While FIG. 8B shows two electrically connected lighting units, this is not a limitation of the present invention, and in other embodiments more than two lighting units may be configured and electrically coupled and powered as described herein.

Figure 8C:
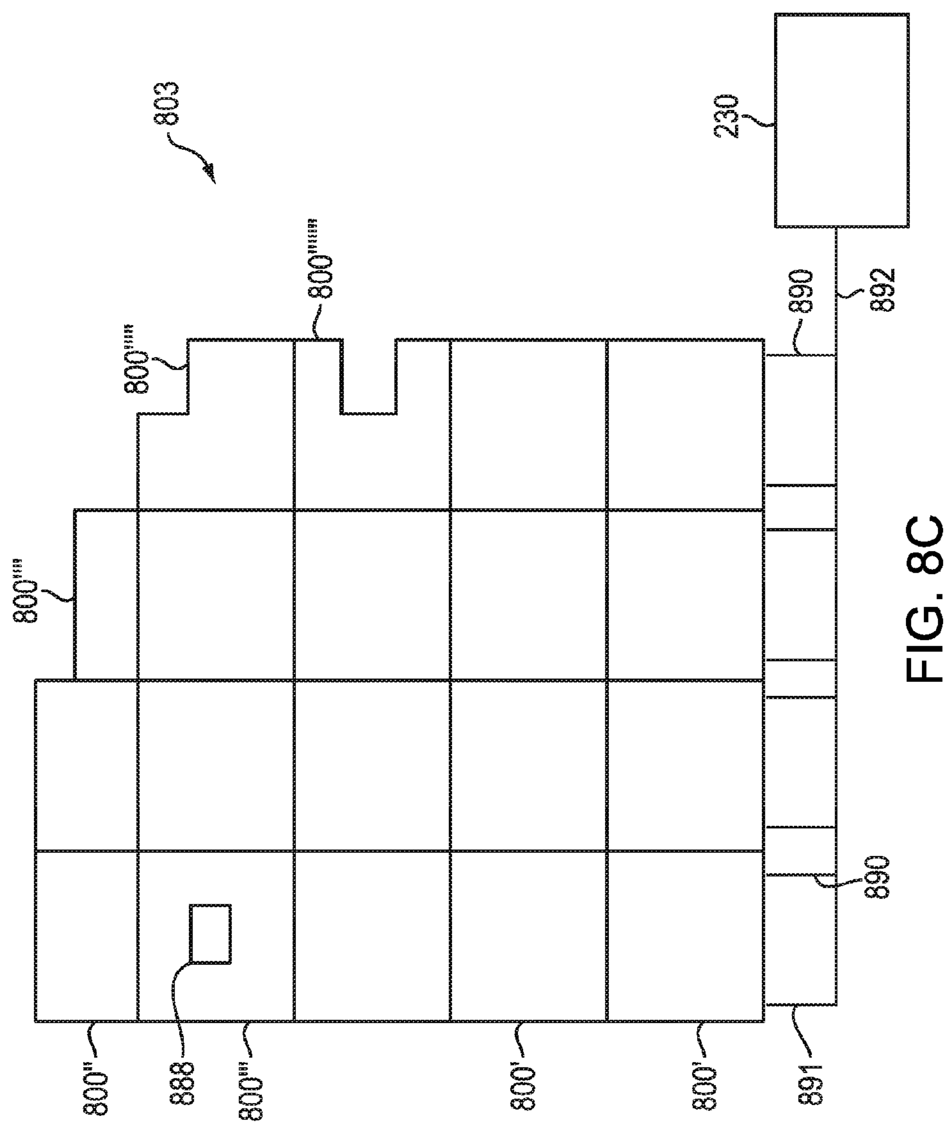

While FIG. 8B shows two lighting units that are the same or substantially the same, this is not a limitation of the present invention, and in other embodiments lighting units that have different shapes, sizes or configurations may be electrically coupled as described herein; preferably, such embodiments feature lighting systems configured to be powered or energized from the same power source. For example, in various embodiments of the present invention, one or more lighting units may be similar to those described in the '149 application, i.e., they are separable in only one direction, or one or more lighting units may be of fixed size and not separable. In various embodiments of the present invention, the light intensity or luminous flux emitted by light sheets or lighting units is engineered to be the same or substantially the same as that emitted by other lighting units that may be incorporated into the lighting system. FIG. 8C shows lighting system 803 that includes multiple lighting units 800, including a lighting unit 800', a lighting unit 800'' that is shortened in one direction, a lighting unit 800''' including a hole 888, a lighting unit 800'''' that is shortened in one direction a different amount than lighting unit 800'', a lighting unit 800''''' in which a corner is removed, and lighting unit 800'''''' having a portion removed along the outer edge of the lighting unit. As shown in FIG. 8C, lighting system 803 also includes power supply 230 that provides power along bus 892 (in various embodiments power bus 892 includes or consists essentially of power distribution lines 890 and 891). As described herein, in various embodiments, each column of lighting units 800 is powered from power bus 892; however, this is not a limitation of the present invention, and in other embodiments more than one column may be powered with only one connection to power bus 892 or other power supply configurations may be utilized.

Figure 8D:
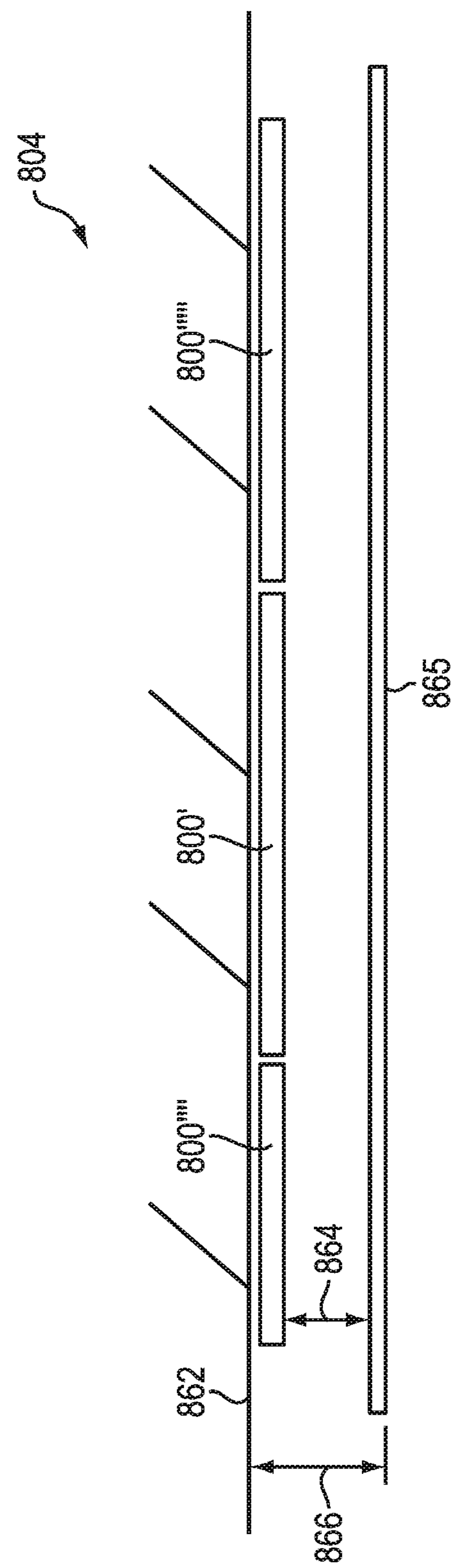

FIG. 8D shows an embodiment of a lighting system 804 of the present invention including or consisting essentially of light panels 800', 800'''', and 800''''' attached to a support 862 and covered or partially covered by an optic 865 (the details of support 862 and of optic 865 are not shown for clarity, nor are they limitations of the present invention). As shown in FIG. 8D, optic 865 is spaced apart from light panels 800', 800'''', and 800''''' by a spacing 864. In various embodiments of the present invention, optic 865 may be in contact with light panels 800', 800'''', and 800''''' or substantially in contact with light panels 800', 800'''', and 800''''', while in other embodiments optic 865 may be in contact or substantially in contact with the LEEs on light panels 800', 800'''', and 800''''', or may be spaced apart from light panels 800', 800'''', and 800''''' as shown in FIG. 8D. In various embodiments of the present invention, spacing 864 may be in the range of about 0.5× to about 5×, or in the range of about 1× to about 2×, the spacing or pitch of LEEs on panels 800', 800'''', and 800'''''. In various embodiments of the present invention, spacing 864 may be in the range of about 5 mm to about 500 mm, or in the range of about 10 mm to about 100 mm. In various embodiments of the present invention, support 862 may include or consist essentially of a wall, ceiling, floor, column, sub-structure, substrate, or other feature to which light panel panels 800', 800'''', and 800''''' may be attached or mounted. In various embodiments of the present invention, optic 865 may include or consist essentially of a lens, a diffuser, a refractive optic, a reflective optic, a Fresnel optic, a fabric, a translucent material such as plastic or stone, a graphic panel, a membrane or the like. In various embodiments of the present invention, optic 865 may include or consist essentially of a plurality of optical elements, for example as described in U.S. patent application Ser. No. 13/693,632, filed on Dec. 4, 2012, the entire disclosure of which is incorporated by reference herein. In various embodiments of the present invention, optic 865 may include or consist essentially of glass, stone, plastic, fabric, foam, paper, or the like.

In various embodiments of the present invention, the total thickness 866 of the lighting system 804 shown in FIG. 8D, i.e., the distance between the back of light panel 862 to the front of optic 865, may be in the range of about 1× to about 5× the spacing or pitch of LEEs on light panels 800', 800'''', and 800''''', or in the range of about 1.5× to about 4× the spacing or pitch of LEEs on light panels 800', 800'''', and 800'''''. In various embodiments of the present invention, a total thickness 866 of the lighting system shown in FIG. 8D may be in the range of about 0.5 cm to about 20 cm, or in the range of about 1 cm to about 10 cm, or in the range of about 1.5 cm to about 5 cm.

In various embodiments, the pitch of LEEs and/or the pitch of light-emitting strings on light sheets of the present invention are engineered to provide the same or substantially the same setback behind a diffuser, graphic panel or other overlying feature as the setback for other lighting units that may be incorporated into the lighting system. In various embodiments of the present invention, the setback spacing may be the same or substantially the same despite a different pitch between LEEs on the different light sheets. In various embodiments of the present invention, the operating current may be different and may be adjusted to achieve the same or substantially the same setback spacing in a system including different light sheets.

Such lighting systems 803 and 804 and similar lighting systems of the present invention provide substantially uniform illumination over large areas. The systems are also configurable to fit different shapes and sizes of areas and also permit formation of holes or penetrations, for example for sprinkler heads, standoffs, heating, and/or air conditioning, and/or ventilation ducts, and the like. In various embodiments of the present invention, the variation in luminous flux across the surface area of a lighting system 803 may be less than about 25%, or less than about 20%, or less than about 15% or less than about 10%.

Figure 8E:
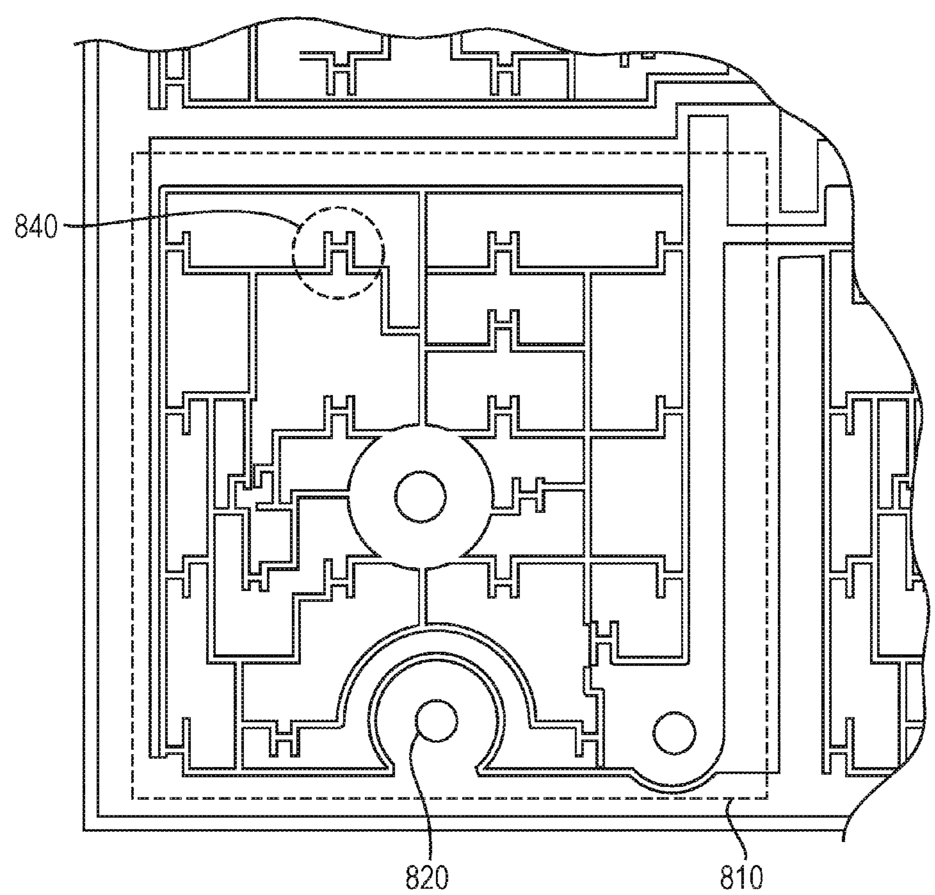

In various embodiments, LEE group 810 may include or consist essentially of multiple LEEs, for example LEEs 140 and optionally one or more control elements, for example to control the intensity, color, or one or more other characteristics of LEEs 140. FIG. 8E shows an enlarged portion of the circuit layout of FIG. 8A, showing LEE group 810 containing multiple positions for LEEs 140, identified as LEE positions 840 in FIGS. 8A and 8E. While FIGS. 8A and 8E show LEE group 810 having 16 LEE positions 840, this is not a limitation of the present invention, and in other embodiments LEE group 810 may have fewer or more LEE positions 840.

Figure 8G:
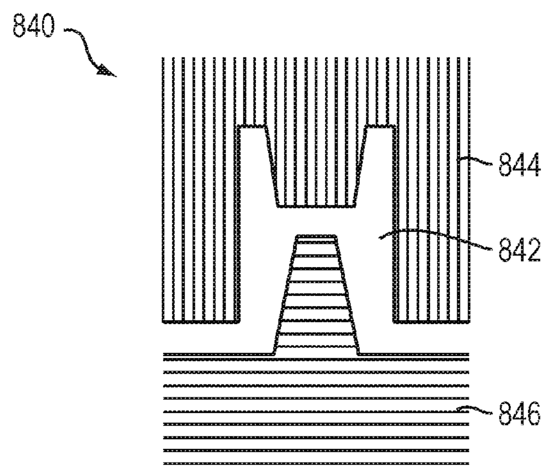
Figure 8F:
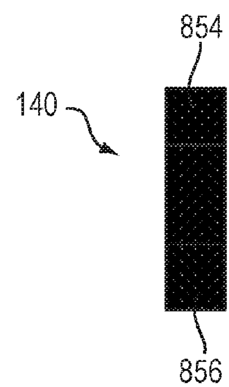
Figure 8H:
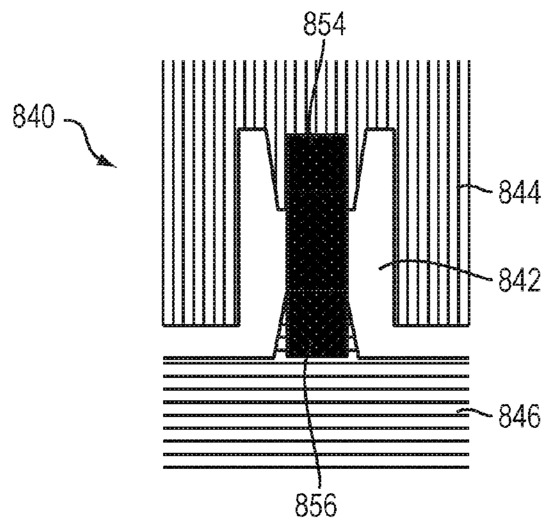

FIG. 8F shows a schematic of an embodiment of a LEE 140 of the present invention, having contacts 854 and 856. FIG. 8G shows a magnified view of the contact side of an embodiment of LEE position 840 of the present invention, having a first contact area 844 and a second contact area 846, separated by a gap 842. In various embodiments of the present invention, contact 854 of LEE 140 is electrically coupled to contact area 844 and contact 856 of LEE 140 is electrically coupled to contact area 846, as shown in FIG. 8H.

Figure 9A:
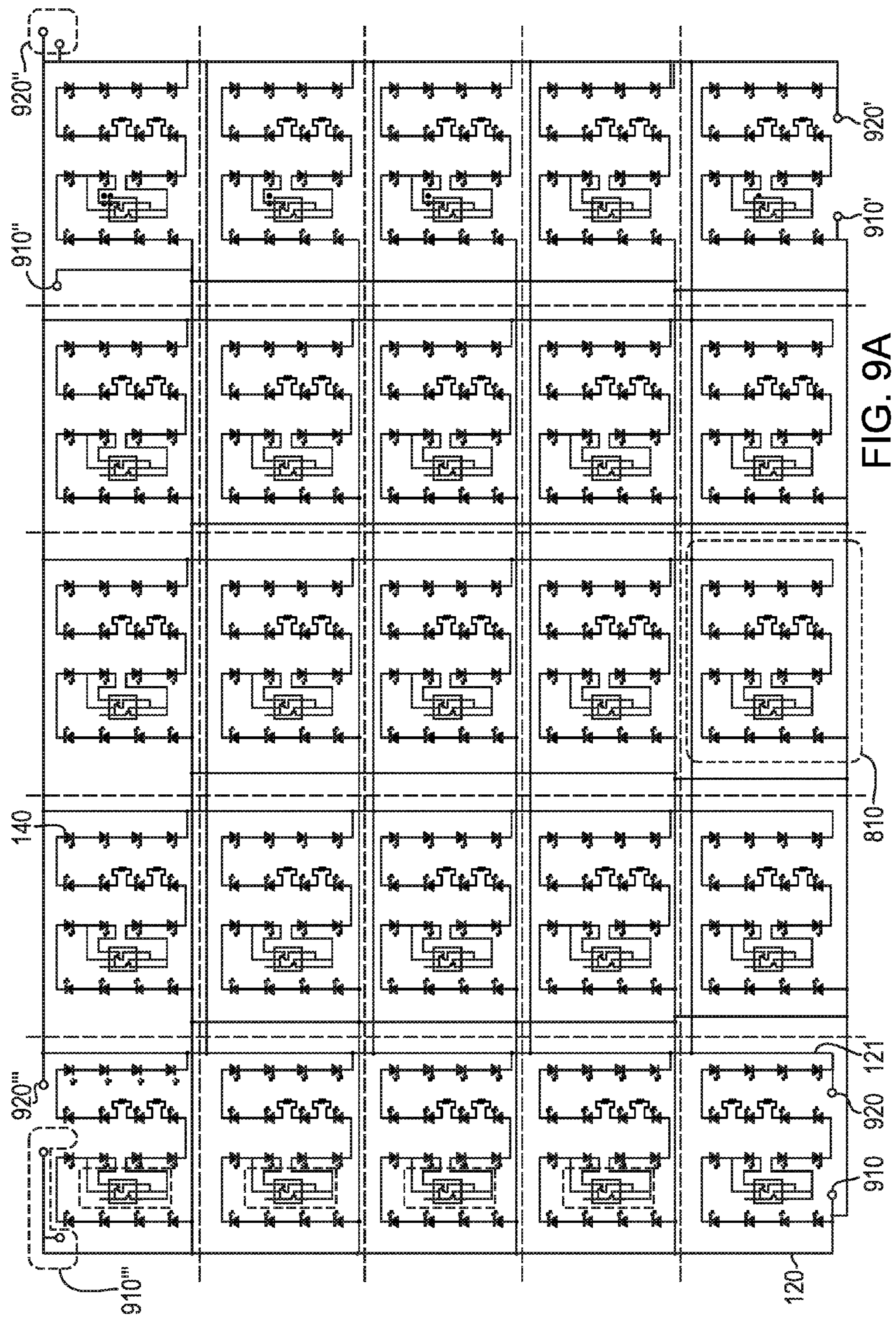
FIG. 9A is a circuit diagram of an illumination system in accordance with various embodiments of the invention.

FIG. 9A shows an electrical schematic of an exemplary embodiment of the present invention including a panel or tile including a 5×5 grid of LEE groups and that is representative of the layout structure shown in FIG. 8A. In various embodiments of the present invention, the circuit of FIG. 9A is energized through contacts 910 and 920. In FIG. 9A, the circuit may be energized through multiple contacts 910, identified as 910, 910', 910'' and 910''' and contacts 920, identified as 920, 920', 920'' and 920'''. The circuit of FIG. 9A includes multiple LEE groups 810—in FIG. 9A the circuit has 25 LEE groups 810; however, this is not a limitation of the present invention, and in other embodiments the system may have fewer or more LEE groups 810. As discussed with respect to FIGS. 8A and 8C, each LEE group 810 may include or consist essentially of multiple LEEs 140. In the embodiment shown in FIG. 9A, each LEE group 810 has 16 LEEs 140; however, this is not a limitation of the present invention, and in other embodiments each LEE group 810 may include a different number of LEEs 140.

Figure 9B:
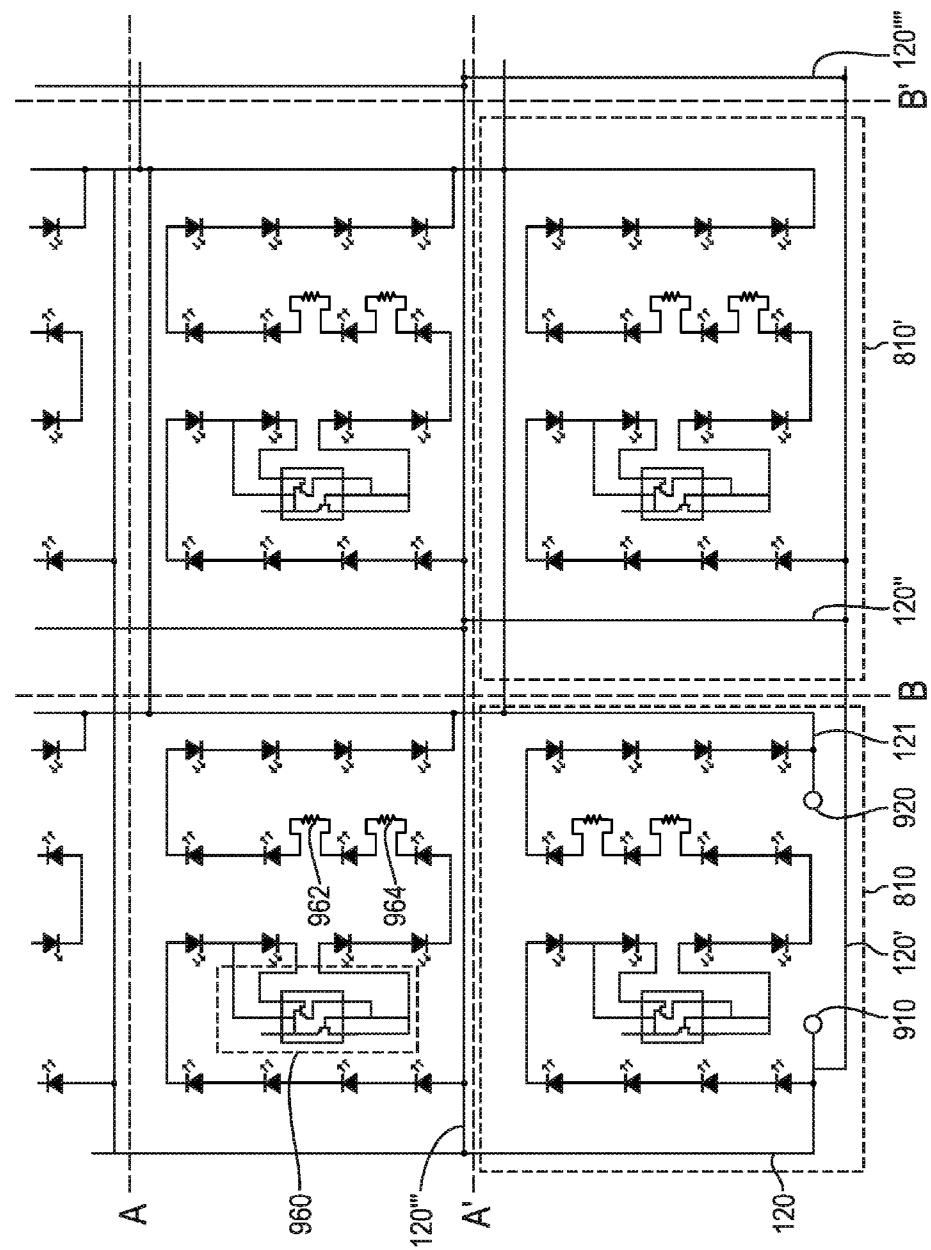
FIGS. 9B-9D are partial circuit diagrams of illumination systems in accordance with various embodiments of the invention.

FIG. 9B shows an enlarged portion of the electrical schematic of FIG. 9A, showing connector areas 910 and 920 and four LEE groups 810. In various embodiments the structure of FIG. 8A corresponding to the electrical layout of FIG. 9A may have one or more LEE groups 810 removed without affecting the operation of the remaining LEE groups 810. The straight dashed lines shown in FIGS. 9A and 9B show schematic cut lines that permit such removal of each LEE group 810 without affecting the operation of the remaining LEE groups 810. As may be seen in FIGS. 9A and 9B, each LEE group 810 is electrically connected through power conductors 120, 121 to the other LEE groups 810 through multiple connections, permitting one or more LEE groups 810 to be removed from the lighting system without affecting the operation of the remaining LEE groups 810.

FIG. 9B shows four complete LEE groups 810 and portions of two surrounding LEE groups 810. As shown in FIG. 9B, in various embodiments the lighting system may be energized through connector areas 910 and 920; for example, power may be applied to connector areas 910 and 920. In various embodiments of the present invention, the lighting system or panel may be energized using a constant or substantially constant voltage or constant current. In various embodiments of the present invention, the lighting system or panel may be energized using a constant or substantially constant DC voltage. In various embodiments of the present invention, the power may be modulated, for example pulse width modulated to modify the light intensity level or to dim the lighting system or panel. As shown in FIG. 9A, multiple connector areas 910 and 920 may be configured on the lighting panel or tile, identified with one or more apostrophes ('), to permit electrical coupling between multiple panels or tiles. In various embodiments a connector, for example a snap connector as described in the '149 application, may be disposed in the area of connector areas 910, 920 and be electrically coupled to connector areas 910, 920; however, this is not a limitation of the present invention, and in other embodiments different connectors or methods of electrically coupling to and between panels and tiles may be utilized.

Figure 9C:
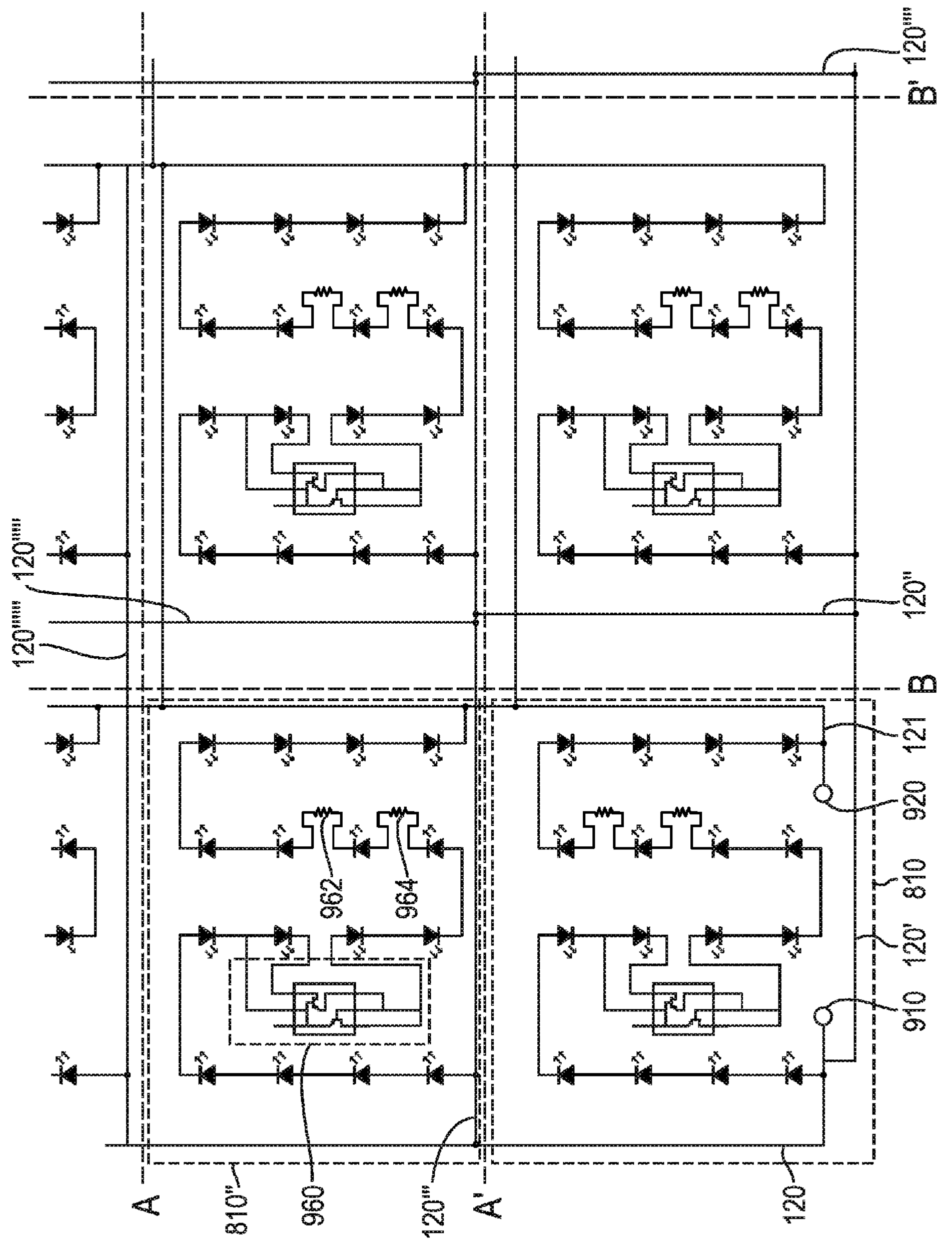

Referring to FIG. 9B, power may be applied to the lighting tile or panel by way of connector areas 910 and 920. In various embodiments, the tile or panel may be energized by a constant or substantially constant voltage. As shown in FIG. 9C, each LEE group 810 includes or consists essentially of 16 LEEs 140, a control circuit 960, and two resistors 962 and 964. In various embodiments of the present invention, control circuit 960 may be configured to regulate the current to LEEs 140, for example to provide a constant or substantially constant current to LEEs 140; however, this is not a limitation of the present invention, and in other embodiments control circuit 960 may be configured for other purposes, for example to control an optical characteristic of LEEs 140, for example, luminous flux, CCT, CRI, spatial light distribution, angular color uniformity, or the like. In various embodiments of the present invention, control circuit 960 may be addressable, for example to permit separate control of each or groups of LEE groups 810. In various embodiments of the present invention, one or more resistors, for example resistors 962 and 964, may be included in the circuit of LEEs 140, for example in series with the series-connected LEEs 140, as shown in FIG. 9C. In various embodiments of the present invention, resistors 962 and 964 may be included in the string to permit use of a string voltage larger than the voltage drop across LEEs 140 and control circuit 960. While in various embodiments this may reduce luminous efficacy, this approach may be utilized to control the number of LEEs 140 within LEE group 810.

Referring to FIG. 9B, connector area 910 is electrically coupled to multiple conductors 120, 120', 120", 120'" and 120"". If LEE group 810' is removed, conductor 120' will be cut at cut line B' and at cut line B and conductor 120" will be cut at cut line A'; however, power will be delivered around the removed LEE group 810' through conductors 120'" and 120"" and the remainder of the tile. A similar configuration is utilized for connector area 920.

Referring to FIG. 9C, if LEE group 810" is removed, conductor 120 will be cut at cut line A' and A, and conductor 120'" will be cut at cut line B; however, power will be delivered around the removed LEE group 810" through conductors 120' and 120" to conductors 120""' and 120""" and the remainder of the tile.

Figure 9D:
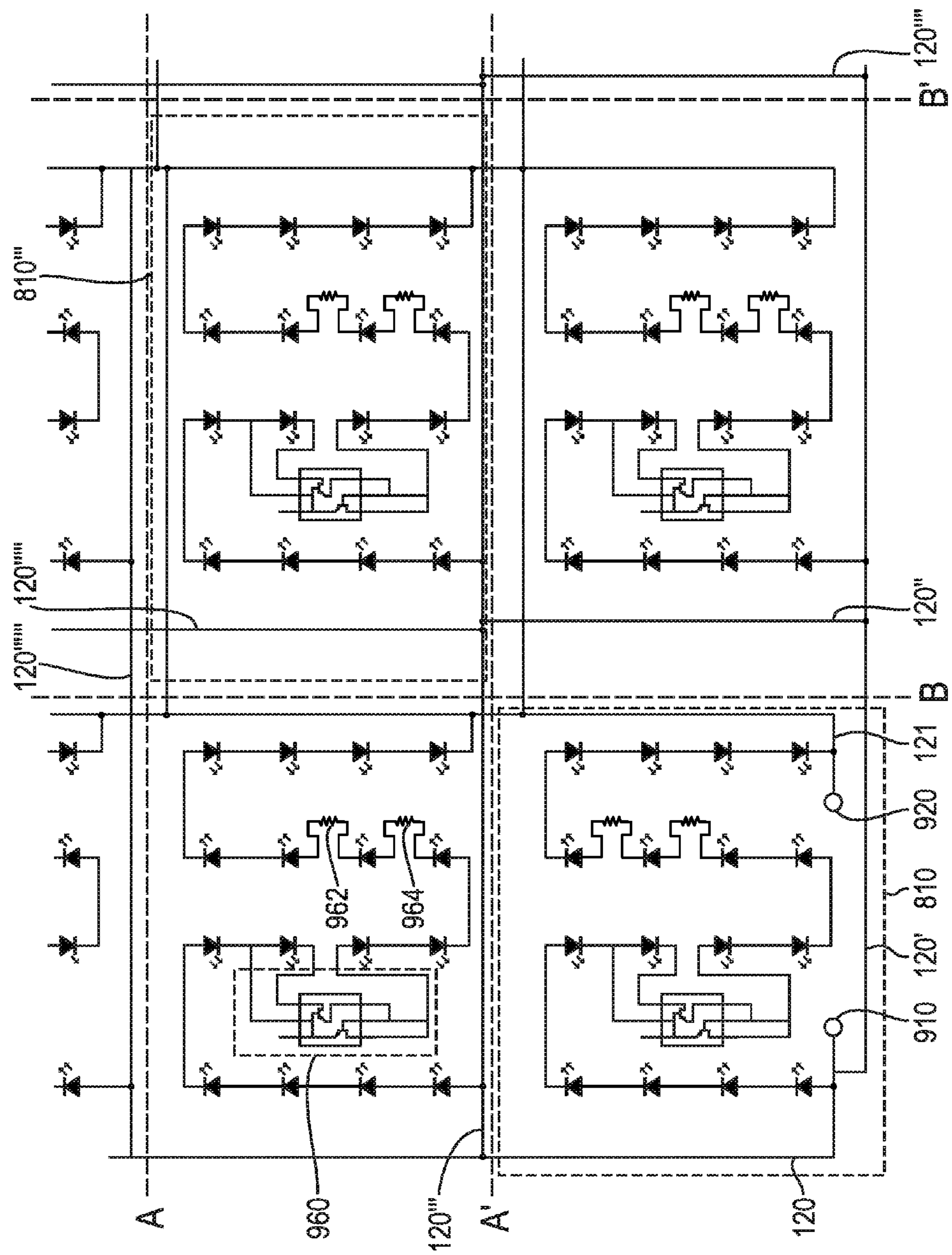

Referring to FIG. 9D, if an interior LEE group, for example group 810'" is removed, conductor 120""' will be severed, but power will be delivered around the removed LEE group 810'", for example by way of conductor 120 and conductor 120""".

In FIGS. 9A-9C, similar configurations are utilized for conductor area 920 and conductors 121, to permit delivery of power around removed LEE groups 810.

While FIGS. 9A-9C show one example of redundant wiring, to permit removal of one or more LEE groups 810, for the edge or interior of the lighting panel or tile, the specific physical layout is not a limitation of the present invention and in other embodiments different physical layouts may be utilized.

While the systems discussed heretofore have been discussed with respect to all LEEs on a tile or panel having the same or substantially the characteristics, this is not a limitation of the present invention, and in other embodiments such systems and methods may be extended to grids or sections having more than one type of LEE per grid. For example, in various embodiments of the present invention a system may have two types of LEEs having different characteristics in each separable grid element or section, for example in grid element or section 450 of FIG. 4B.

Figure 10:
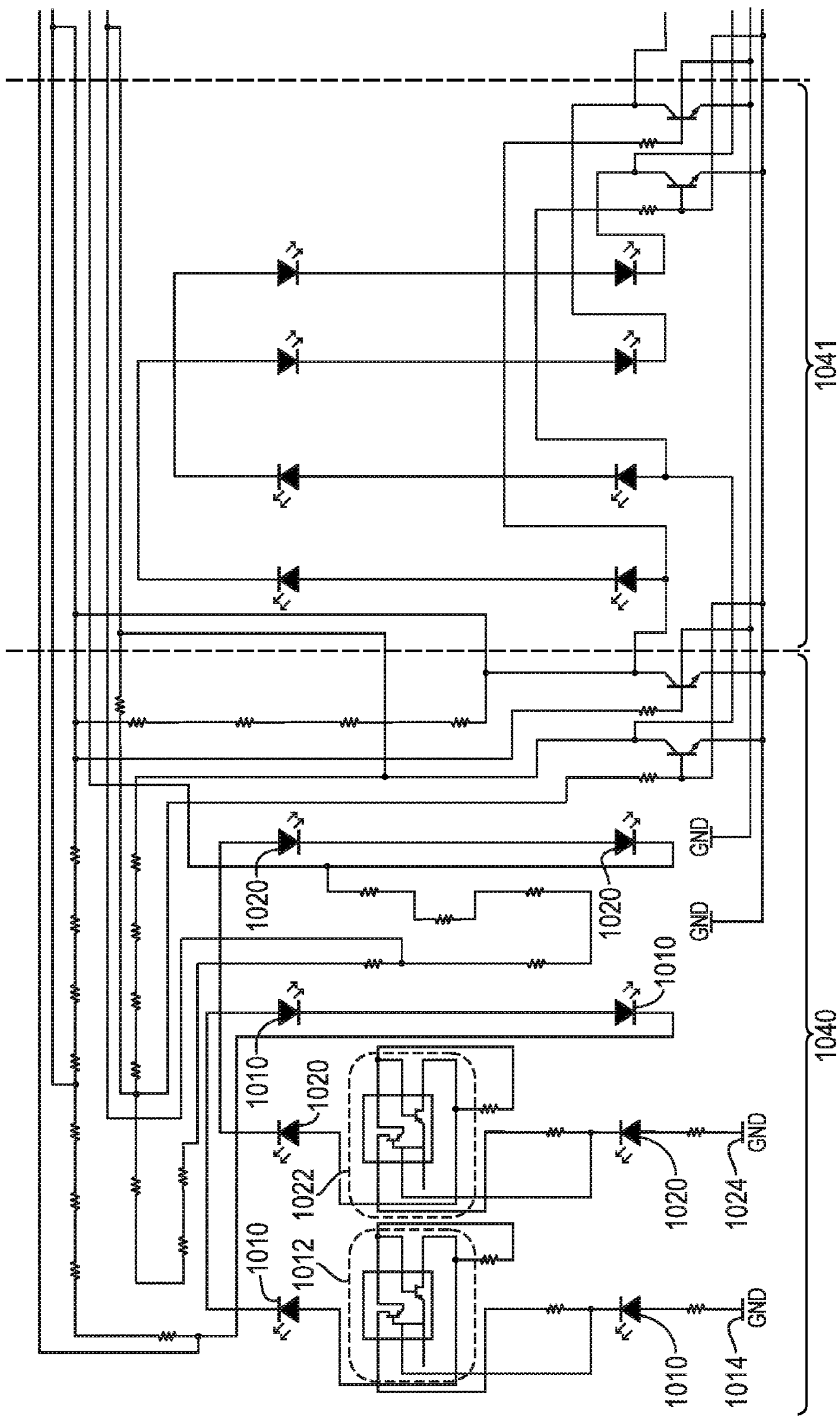
FIG. 10 is a partial circuit diagram of an illumination system in accordance with various embodiments of the invention.

FIG. 10 shows a schematic of a partial system in accordance with various embodiments of the present invention showing each section or grid having two groups of LEEs. The structure of FIG. 10 shows two grids, identified as 1040 and 1041. The sections shown in FIG. 10 are similar to those shown in FIG. 4A, except that each section or grid has two groups of LEEs in FIG. 10, whereas in FIG. 4A each section or grid has one group of LEEs. Each grid or section in FIG. 10 has two types of LEEs, four LEEs identified as type 1010 and four LEEs identified as type 1020; thus, each grid or section has eight total LEEs. In various embodiments of the present invention, each type of LEE may have a different optical characteristic. For example, in various embodiments each type of LEE may have a different CCT, for example a relatively cool CCT for one group and a relatively warm CCT for a second group. In various embodiments, a cool CCT may have values in the range of about 4000K to about 10,000K and a warm CCT may have values in the range of about 1500K to about 3000K. In various embodiments of the present invention, each grid or section may have its associated current control circuitry identified as 1012 for LEEs 1010 and 1022 for LEEs 1020. In various embodiments of the present invention, power may be applied to each type of LEE through connections 1014 for LEEs 1010 and through connections 1024 for LEEs 1020. In various embodiments of the present invention, each group may be independently energized or powered, for example through connections 1014 and 1024; however, this is not a limitation of the present invention, and in other embodiments the amount of power to each type of LEE may be fixed, or may be limited to two or more pre-set values or may be controlled in any other manner.

In various embodiments of the present invention, the different types of LEEs may have one or more different electrical and/or optical characteristics, such as correlated color temperature (CCT), color rendering index (CRI), luminous flux, radiant flux, R9, spatial intensity distribution pattern, spectral power density, forward voltage or the like. For example, in various embodiments of the present invention, each group of LEEs may have a different CCT, for example a relatively cool CCT for one group and a relatively warm CCT for a second group, and the intensity of each group may be separately and/or independently adjusted, for example by the amount of power applied to terminals 1014 and 1024, to permit tuning of the value of the CCT of the light emitted from the system between the CCTs of each group, that is from warm to cool. In various embodiments of the present invention, the two types of LEEs may have different spatial intensity distribution patterns and the overall spatial intensity distribution pattern may varied by varying the power to the two types of LEEs. In various embodiments of the present invention, the two types of LEEs may have different spectral power distributions and the overall spectral power distribution may varied by varying the power to the two types of LEEs.

In various embodiments of the present invention, a group may include more than two different types of LEEs. For example a group may have three or more LEE types, each having a different CCT, for example a relatively warm CCT, a relatively cool CCT, and a CCT in between the relatively warm and relatively cool CCT. In such embodiments, the CCT may be varied between the warm and cool CCTs while maintaining the color point on or substantially on the black body locus.

As discussed herein, the number of LEEs in each group is not a limitation of the present invention; while FIG. 10 shows four LEEs of each type in each group, other numbers of LEEs per group and configurations are within the scope of the present invention.

While removal of a portion of the sheet or substrate has been referred to as cutting or shortening, this is not a limitation of the present invention, and in other embodiments removal of a portion of the sheet may be accomplished by other means, for example breaking or tearing, die cutting, sawing, or the like. The method of removing a portion of the sheet or substrate is not a limitation of the present invention. In various embodiments, the sheet or substrate may have guide lines (e.g., features such as dashed lines printed on the sheet or substrate) to aid in the separation process. In various embodiments, the guide lines may provide a guide for the separation process, while in other embodiments the guide lines may incorporate one or more features to aid in separation, for example perforations in the substrate, a reduction in the thickness of the substrate, the absence of conductive trace material in the separation region, or the like.

In various embodiments of the present invention, substrate 165 is flexible, while in other embodiments substrate 165 may be rigid or semi-rigid. The rigidity of substrate 165 is not a limitation of the present invention. In various embodiments of the present invention, substrate 165 may include, consist essentially of, or consist of one or more of the following: fiberglass, FR4, FR2, acrylic, cloth, polyester, polyimide, polyethylene, polyethersulfone, polyethylene napthalate (PEN), polyetherimide (PEI), polyethylene terephthalate, aluminum, metal, metal core printed circuit board, (MCPCB), fabric, paper, or glass. In various embodiments of the present invention, conductive elements interconnecting LEEs may include, consist essentially of, or consist of one or more of the following: copper, aluminum, carbon, conductive fibers, gold, silver, transparent conductive materials (e.g., transparent conductive oxides such as indium tin oxide), conductive nanocomposites, or conductive ink. The materials of substrate 165 and the conductive elements are not limitations of the present invention.

In some embodiments, a flexible substrate 165 is configurable to a radius of curvature of about 1 m or less, or about 0.5 m or less, or even about 0.1 m or less. In some embodiments, a flexible substrate 165 has a Young's Modulus less than about 100 $N/m^2$, less than about 1 $N/m^2$, less than about 0.1 $N/m^2$, or even less than about 0.05 $N/m^2$. In some embodiments, a flexible substrate 165 has a Shore A hardness value less than about 100; a Shore D hardness less than about 100; and/or a Rockwell hardness less than about 150.

In various embodiments of the present invention, removal of a portion of a light sheet, for example to remove a LEE, may be performed using scissors or a knife or another cutting tool. In various embodiments of the present invention, lines or shapes demarking cut lines may be marked on the light sheet, for example as a pattern in the conductive metal on the substrate or printed on the light sheet or by other means. In various embodiments of the present invention, portions of the substrate and/or the conductive traces may be perforated or scored to indicate cut lines and/or to facilitate removal of a portion of the light sheet.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A lighting system comprising:

a lightsheet comprising:

a substrate;

one or more first electrical contacts disposed on the substrate and electrically connected to each other;

one or more second electrical contacts disposed on the substrate and electrically connected to each other, wherein the one or more first electrical contacts are electrically isolated from the one or more second electrical contacts; and a plurality of illumination modules disposed on the substrate and electrically connected to each other, each illumination module comprising (i) one or more electrically connected light-emitting elements, (ii) a first power conductor, and (iii) a second power conductor electrically isolated from the first power conductor, wherein the one or more light-emitting elements are electrically connected between and energizable by the first and second power conductors, wherein (i) the first power conductors of the illumination modules are electrically connected to the one or more first electrical contacts, (ii) the second power conductors of the illumination modules are electrically connected to the one or more second electrical contacts, (iii) the illumination modules are collectively energizable via application of power to a first electrical contact and a second electrical contact, and (iv) the first and second power conductors of the illumination modules are electrically connected to enable energization of all remaining illumination modules upon removal of any illumination module from the lightsheet.

2. The lighting system of claim 1, wherein:

the first and second power conductors of each illumination module form an independent path electrically connected to at least one first electrical contact and at least one second electrical contact; and removal of any illumination module does not sever the independent path formed by the first and second power conductors of any other illumination module.

3. The lighting system of claim 1, further comprising one or more control elements configured to control current to at least one of the illumination modules.

4. The lighting system of claim 3, wherein (i) the one or more control elements comprise a plurality of control elements, and (ii) each illumination module has a different control element electrically coupled thereto.

5. The lighting system of claim 1, wherein at least one illumination module comprises one or more connectors for mechanical and electrical connection to an adjoining illumination module.

6. The lighting system of claim 5, wherein at least one of the connectors comprises a snap connector.

7. The lighting system of claim 1, wherein the light-emitting elements of at least one illumination module comprise light-emitting diodes.

8. The lighting system of claim 1, wherein the one or more light-emitting elements of at least one illumination module comprise a plurality of light-emitting elements that are electrically connected in series.

9. The lighting system of claim 1, wherein:

each illumination module comprises a plurality of electrically connected illumination units; and each illumination unit comprises (i) one or more electrically connected light-emitting elements, and (ii) a bypass element (a) electrically connected across the first and second power conductors and (b) configured to transition from a high-impedance state to a low-impedance state and thereby complete a circuit between the first and second power conductors upon removal of the one or more light-emitting elements of the illumination unit from the lightsheet, whereby energization of unremoved light-emitting elements within the illumination module is maintained.

10. The lighting system of claim 9, wherein at least one of the bypass elements comprises at least one of a switch, a relay, a Zener diode, or a circuit comprising at least one transistor and at least one resistor.

11. The lighting system of claim 9, wherein at least one illumination module further comprises a second illumination unit comprising one or more electrically connected light-emitting elements without a bypass element associated therewith.

12. The lighting system of claim 11, further comprising a power supply electrically connected to at least one of the first electrical contacts and at least one of the second electrical contacts, wherein (i) the at least one illumination module extends from a proximal end proximate the power supply to a distal end away from the power supply, and (ii) the second illumination unit is disposed at the proximal end.

13. The lighting system of claim 9, wherein, for at least one illumination module, at least one illumination unit further comprises (i) a voltage-drop element and (ii) a shunt configured to (a) prevent voltage drop across the voltage-drop element when the one or more light-emitting elements of the illumination unit are present on the lightsheet, and (b) upon removal of the one or more light-emitting elements of the illumination unit, cause a voltage drop across the voltage-drop element.

14. The lighting system of claim 13, wherein the shunt is configured to be at least partially removed upon removal of the one or more light-emitting elements of the illumination unit, thereby causing the voltage drop across the voltage-drop element.

15. The lighting system of claim 13, wherein the voltage drop across the voltage-drop element is approximately equal to a voltage drop across the one or more light-emitting elements of the illumination unit when the one or more light-emitting elements of the illumination unit are present on the lightsheet.

16. The lighting system of claim 13, wherein the voltage-drop element comprises a resistor.

17. The lighting system of claim 9, wherein, for each illumination unit, (i) the one or more electrically connected light-emitting elements are electrically connected in series with the first power conductor, (ii) the bypass element has first and second electrical connection points, (iii) the first electrical connection point of the bypass element is electrically connected between (a) the one or more light-emitting elements of the illumination unit and (b) the one or more light-emitting elements of an adjoining illumination unit, and (iv) the second electrical connection point of the bypass element is electrically connected to the second power conductor.

18. The lighting system of claim 9, wherein at least one bypass element has a resistance of at least $10^6$ ohms in the high-impedance state.

19. The lighting system of claim 9, wherein at least one bypass element has a resistance no greater than $10^3$ ohms in the low-impedance state.

20. The lighting system of claim 1, further comprising a second lightsheet electrically connected to the lightsheet.

21. The lighting system of claim 1, further comprising an optic disposed over at least a portion of the lightsheet.

22. The lighting system of claim 21, wherein the optic comprises at least one of a lens, a diffuser, a refractive optic, a reflective optic, a Fresnel optic, a fabric, a translucent material panel, a graphic panel, or a membrane.

23. The lighting system of claim 1, wherein an optical characteristic of one or more of the illumination units is different from a corresponding optical characteristic of one or more other illumination units.

24. The lighting system of claim 23, wherein the optical characteristic comprises at least one of correlated color temperature, color rendering index, R9, spectral power distribution, or spatial light intensity distribution.

25. The lighting system of claim 1, wherein the substrate is flexible.

26. The lighting system of claim 1, wherein along each illumination unit, a pitch at which the light-emitting elements are spaced is substantially constant.

27. The lighting system of claim 1, wherein the lightsheet comprises one or more connectors for mechanical and/or electrical connection to an adjoining lightsheet.

28. The lighting system of claim 1, further comprising:

a first snap connector electrically connected to the one or more first electrical contacts;

a second snap connector electrically connected to the one or more second electrical contacts; and a second lightsheet comprising:

a second substrate, third and fourth power conductors disposed on the second substrate, a plurality of second light-emitting elements disposed on the second substrate and electrically connected to the third and fourth power conductors, a third snap connector electrically connected to the third power conductor, and a fourth snap connector electrically connected to the fourth power conductor, wherein (i) the first snap connector is configured for connection to the third snap connector, thereby electrically coupling the one or more first electrical contacts to the third power conductor, (ii) the second snap connector is configured for connection to the fourth snap connector, thereby electrically coupling the one or more second electrical contacts to the fourth power conductor.

* * * * *